United States Patent
Rugtvedt et al.

(10) Patent No.: US 9,327,458 B2
(45) Date of Patent: May 3, 2016

(54) IN-SITU ANNEALING OF POLYMER FIBERS

(71) Applicant: The Boeing Company, Chicago, IL (US)

(72) Inventors: Arthur Rugtvedt, Covington, WA (US); Mark S. Wilenski, Mercer Island, WA (US); Michael P. Kozar, Mercer Island, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/502,384

(22) Filed: Sep. 30, 2014

(65) Prior Publication Data

US 2016/0089843 A1  Mar. 31, 2016

(51) Int. Cl.
*B29C 70/42* (2006.01)
*B29C 70/50* (2006.01)
*B29C 71/02* (2006.01)
*B29C 70/28* (2006.01)
*B29C 55/00* (2006.01)
B29K 101/12 (2006.01)
B29K 105/08 (2006.01)

(52) U.S. Cl.
CPC ............ *B29C 71/02* (2013.01); *B29C 55/005* (2013.01); *B29C 70/28* (2013.01); *B29C 2071/022* (2013.01); *B29K 2101/12* (2013.01); *B29K 2105/0809* (2013.01)

(58) Field of Classification Search
CPC ........ B29C 70/42; B29C 70/50; B29C 71/02; B29C 2071/022

USPC ............ 264/134, 135, 136, 137, 171.1, 229, 264/235, 236, 257, 258, 346, 347
See application file for complete search history.

(56) References Cited

U.S. PATENT DOCUMENTS

| | | | |
|---|---|---|---|
| 4,461,855 A | | 7/1984 | Phillips |
| 4,919,856 A | * | 4/1990 | Anazawa et al. .......... 264/134 X |
| 4,976,909 A | * | 12/1990 | Dorband et al. ............. 264/235 |
| 5,060,553 A | | 10/1991 | Jones |
| 5,665,450 A | | 9/1997 | Day et al. |

(Continued)

FOREIGN PATENT DOCUMENTS

| DE | 202011002787 | 5/2011 |
|---|---|---|
| EP | 2145822 | 1/2010 |

(Continued)

OTHER PUBLICATIONS

H. Lin, et al. "Temperature and wavelength dependent transmission of optically transparent glass fibre poly(methyl methacrylate) composites," Journal of Materials Science 29 (1994) 5193-5198.

(Continued)

*Primary Examiner* — Leo B Tentoni

(57) ABSTRACT

A method of manufacturing a composite article may include attaching a polymer element to a tool. The polymer element may be pre-stretched prior to attachment to the tool. The method may further include annealing the polymer element at a predetermined temperature while constraining a length of the polymer element using the tool. In addition, the method may include curing or solidifying resin associated with the polymer element. The annealing step may be performed prior to the curing or solidifying step. Alternatively, the annealing step may be performed concurrently with the curing or solidifying step.

20 Claims, 18 Drawing Sheets

(56) References Cited

U.S. PATENT DOCUMENTS

| | | |
|---|---|---|
| 6,332,390 B1 | 12/2001 | Lyons |
| 6,889,938 B1 | 5/2005 | Nordman |
| 8,087,340 B2 | 1/2012 | Hansen |
| 8,245,975 B2 | 8/2012 | Abel |
| 8,559,779 B2 | 10/2013 | Kozar |
| 2002/0106510 A1 | 8/2002 | Deguchi |
| 2004/0062934 A1 | 4/2004 | Miller |
| 2008/0241537 A1 | 10/2008 | Sennett et al. |
| 2009/0181211 A1 | 7/2009 | Lang |
| 2010/0263525 A1 | 10/2010 | Siebers |
| 2012/0006190 A1 | 1/2012 | Zachau |
| 2012/0152099 A1 | 6/2012 | Wilenski et al. |
| 2013/0334366 A1 | 12/2013 | Wilenski et al. |
| 2013/0337230 A1 | 12/2013 | Wilenski et al. |

FOREIGN PATENT DOCUMENTS

| | | |
|---|---|---|
| GB | 2284655 | 6/1995 |
| JP | 2009264692 | 12/2009 |
| WO | WO02094674 | 11/2002 |
| WO | WO2006016393 | 2/2006 |
| WO | WO2010066819 | 6/2010 |

OTHER PUBLICATIONS

International Search Report for PCT/US2011/060177 dated Feb. 14, 2012.

European Search Report for EP Application No. 13170925.5 dated Aug. 2, 2013.

* cited by examiner

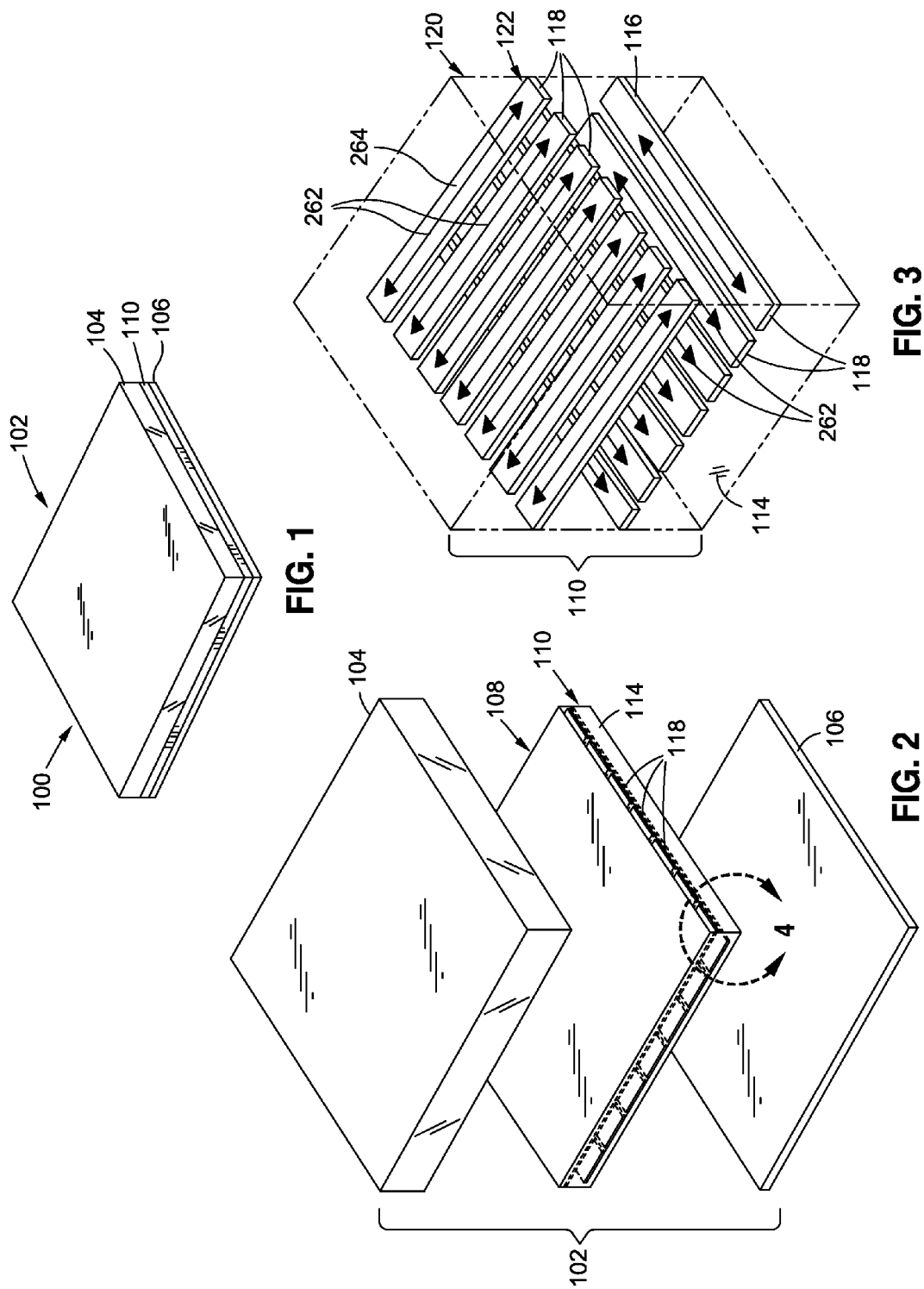

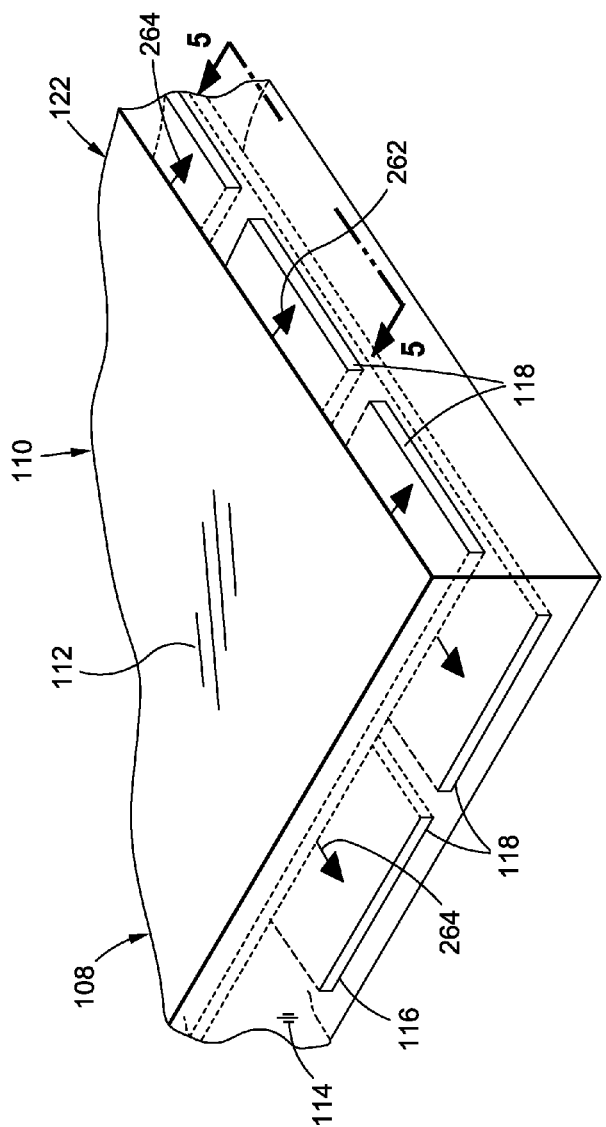
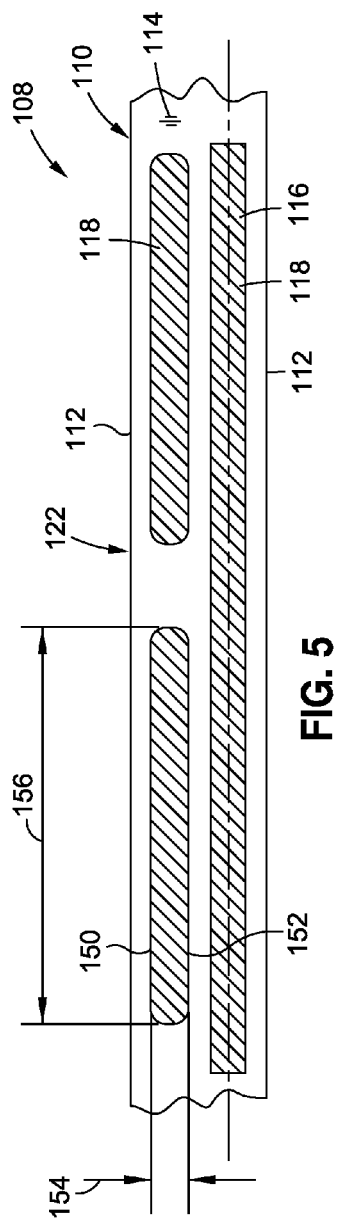
FIG. 4
FIG. 5

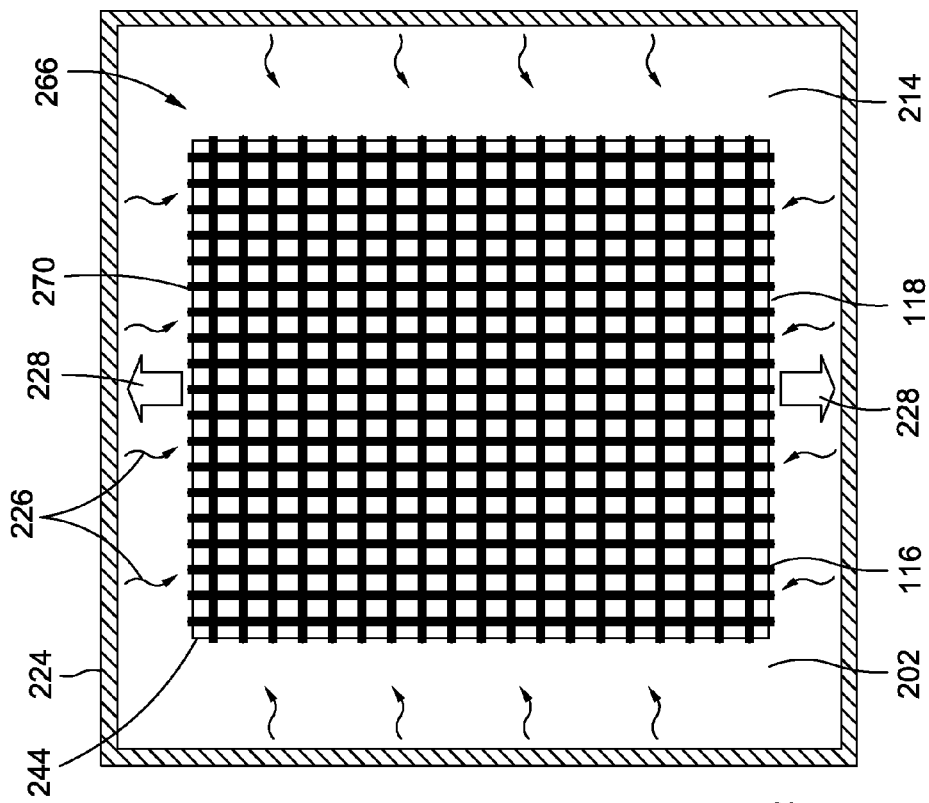
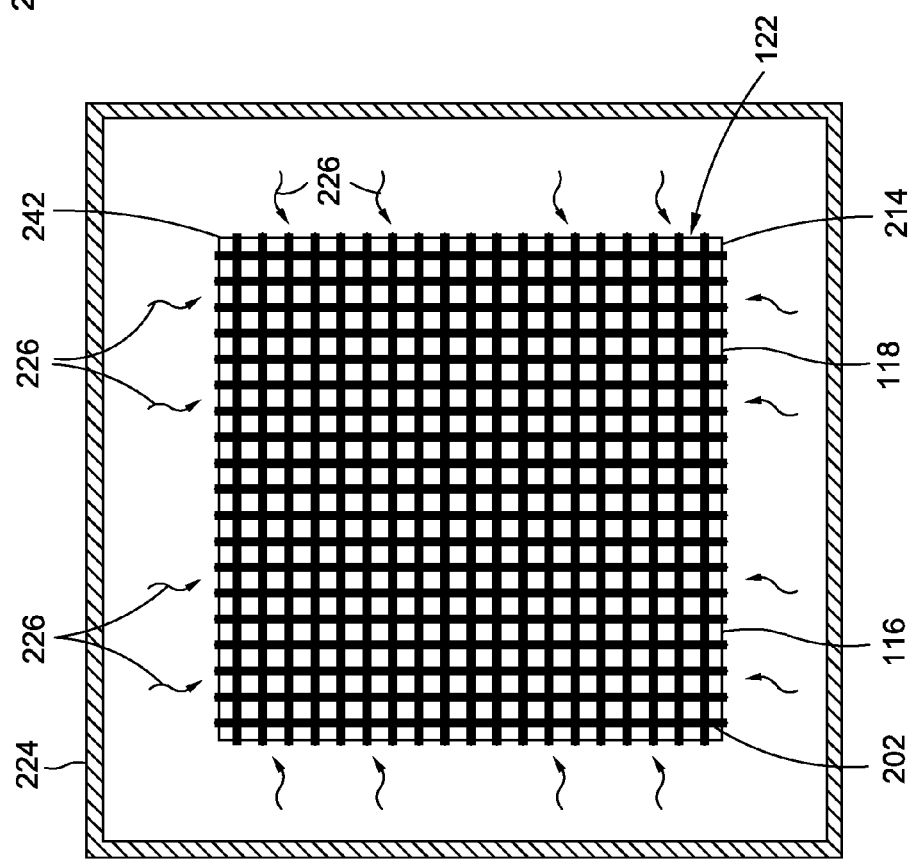

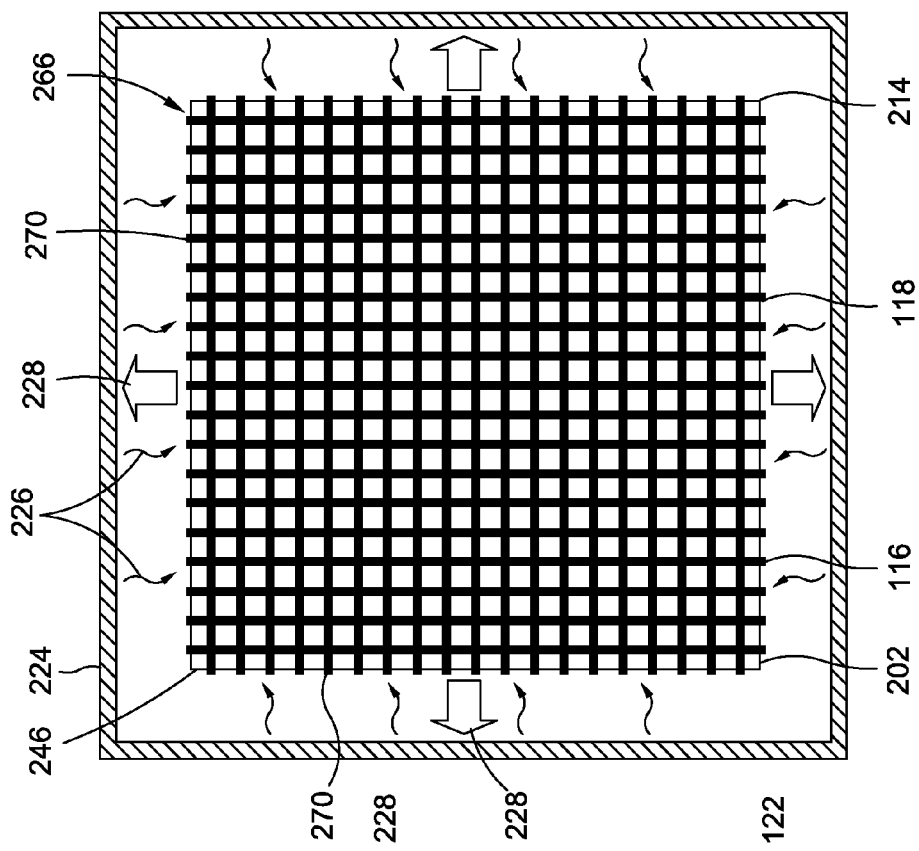
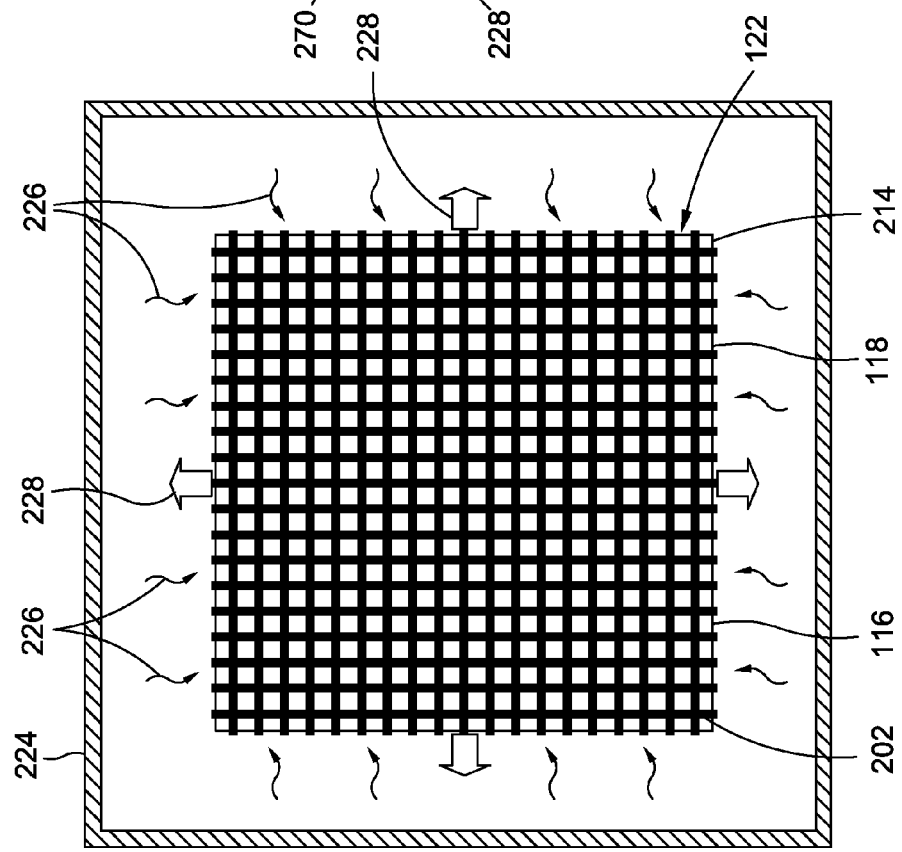

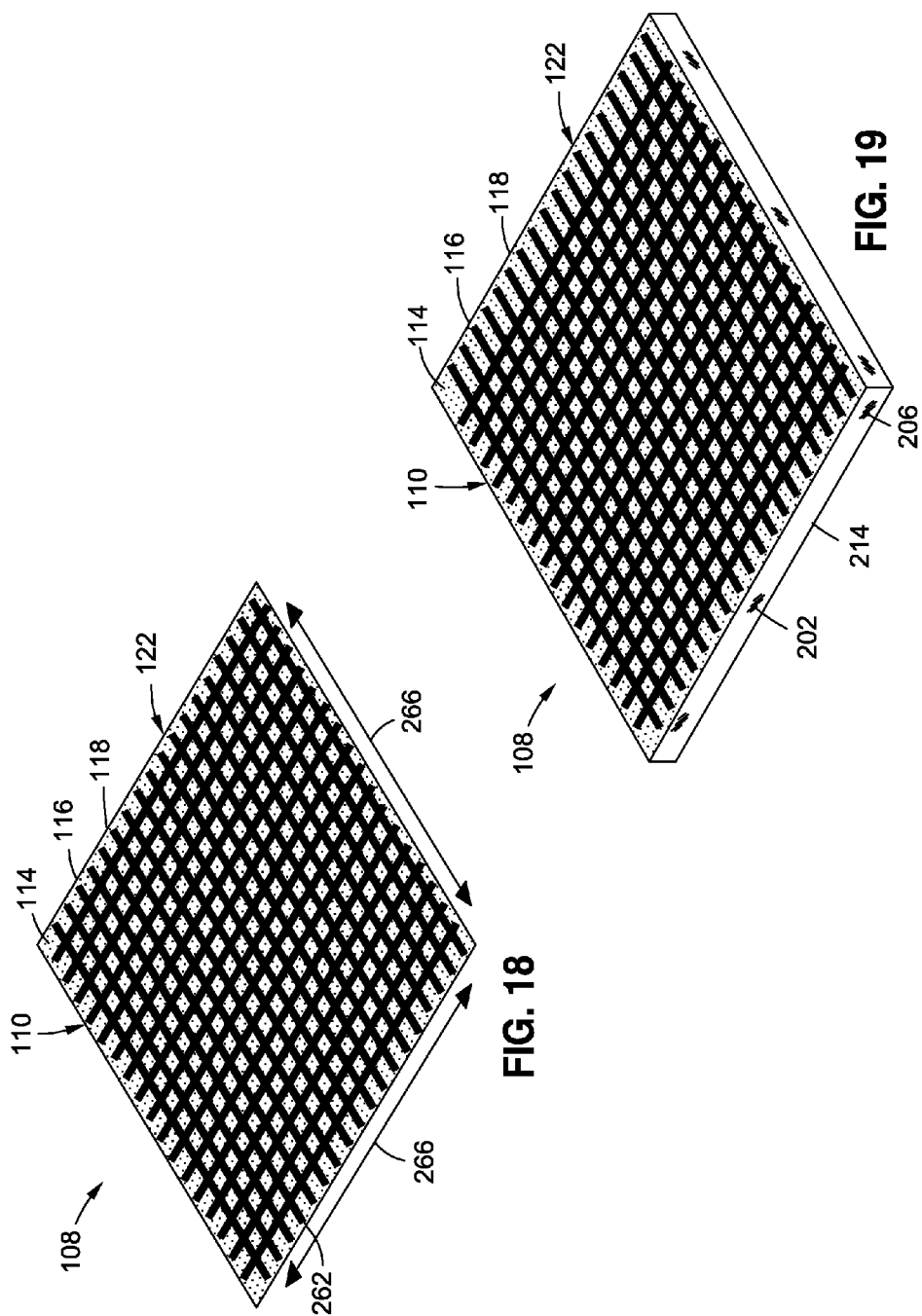

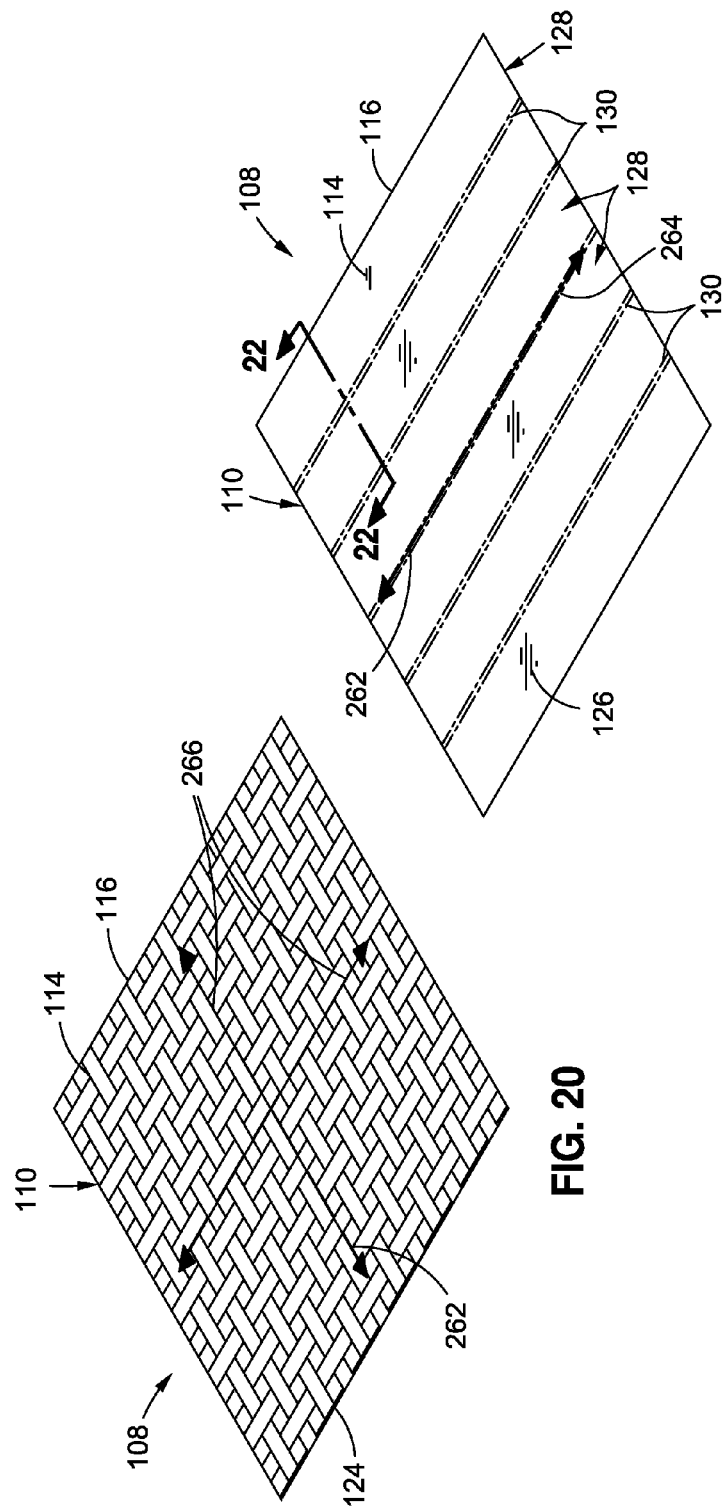
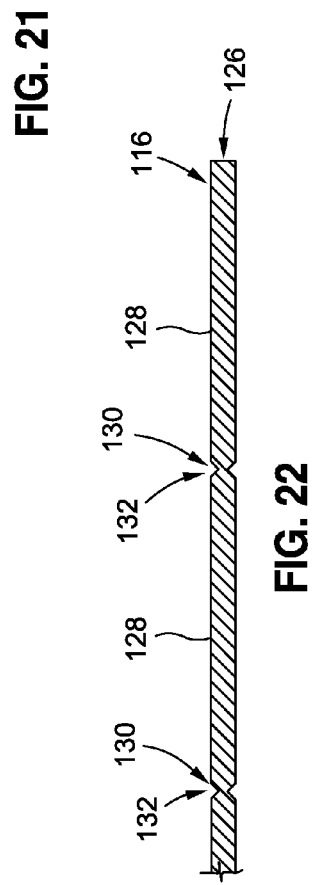

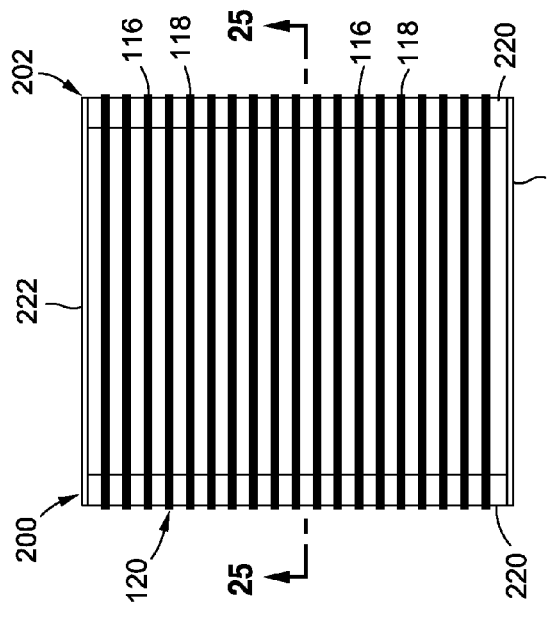
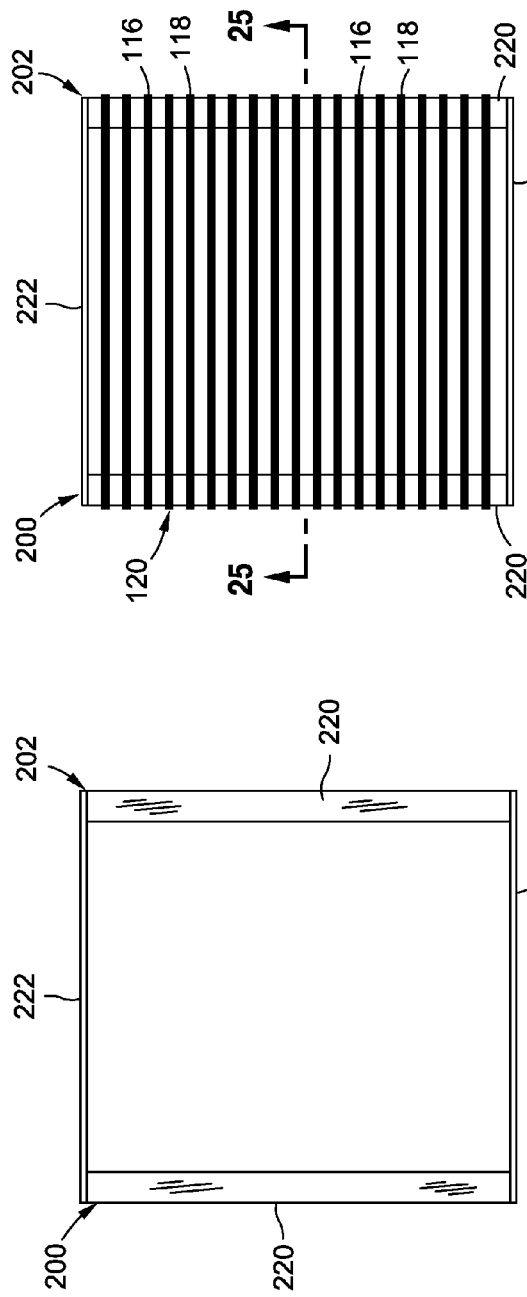
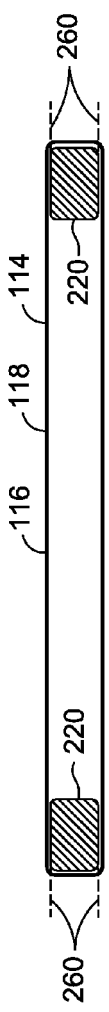
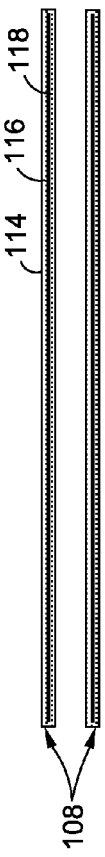
FIG. 23
FIG. 24
FIG. 25
FIG. 26

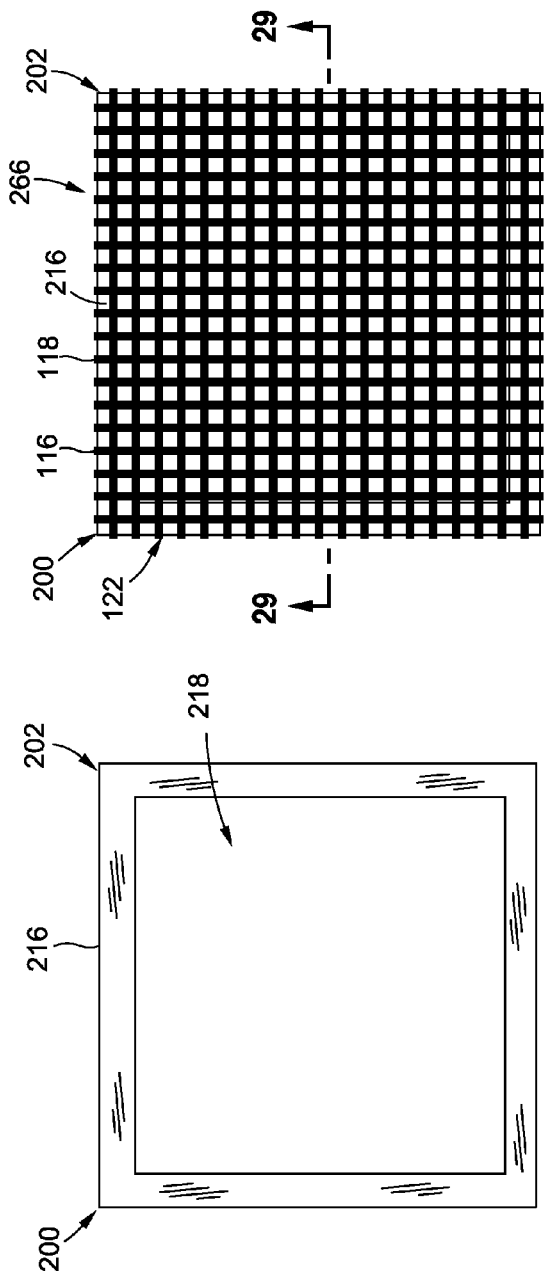
FIG. 27
FIG. 28
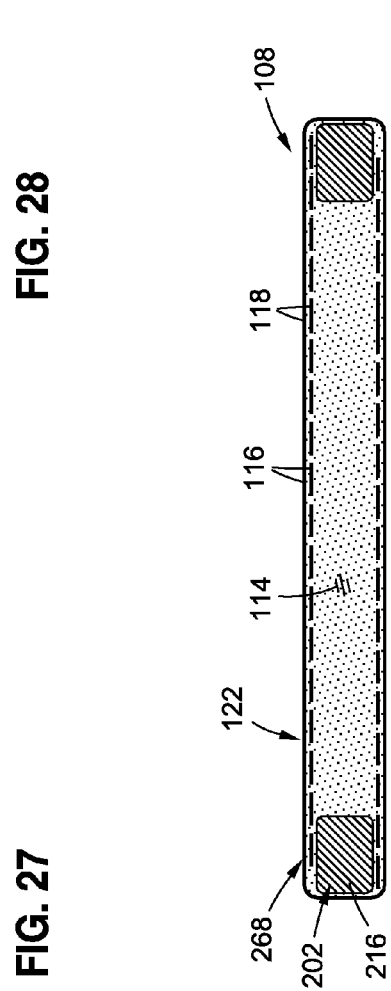
FIG. 29

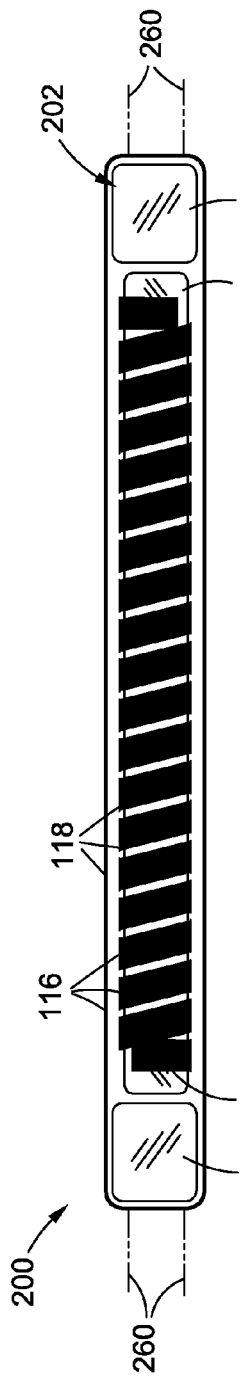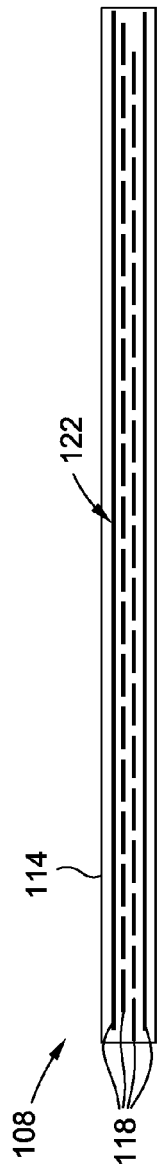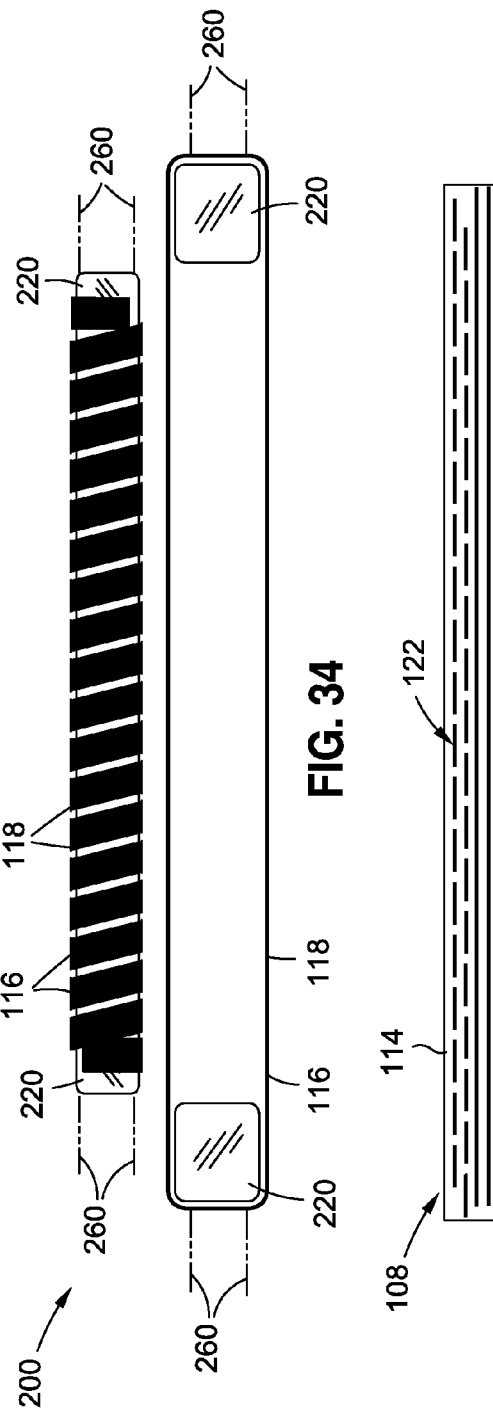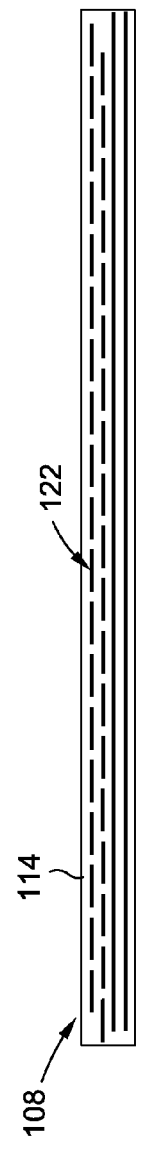

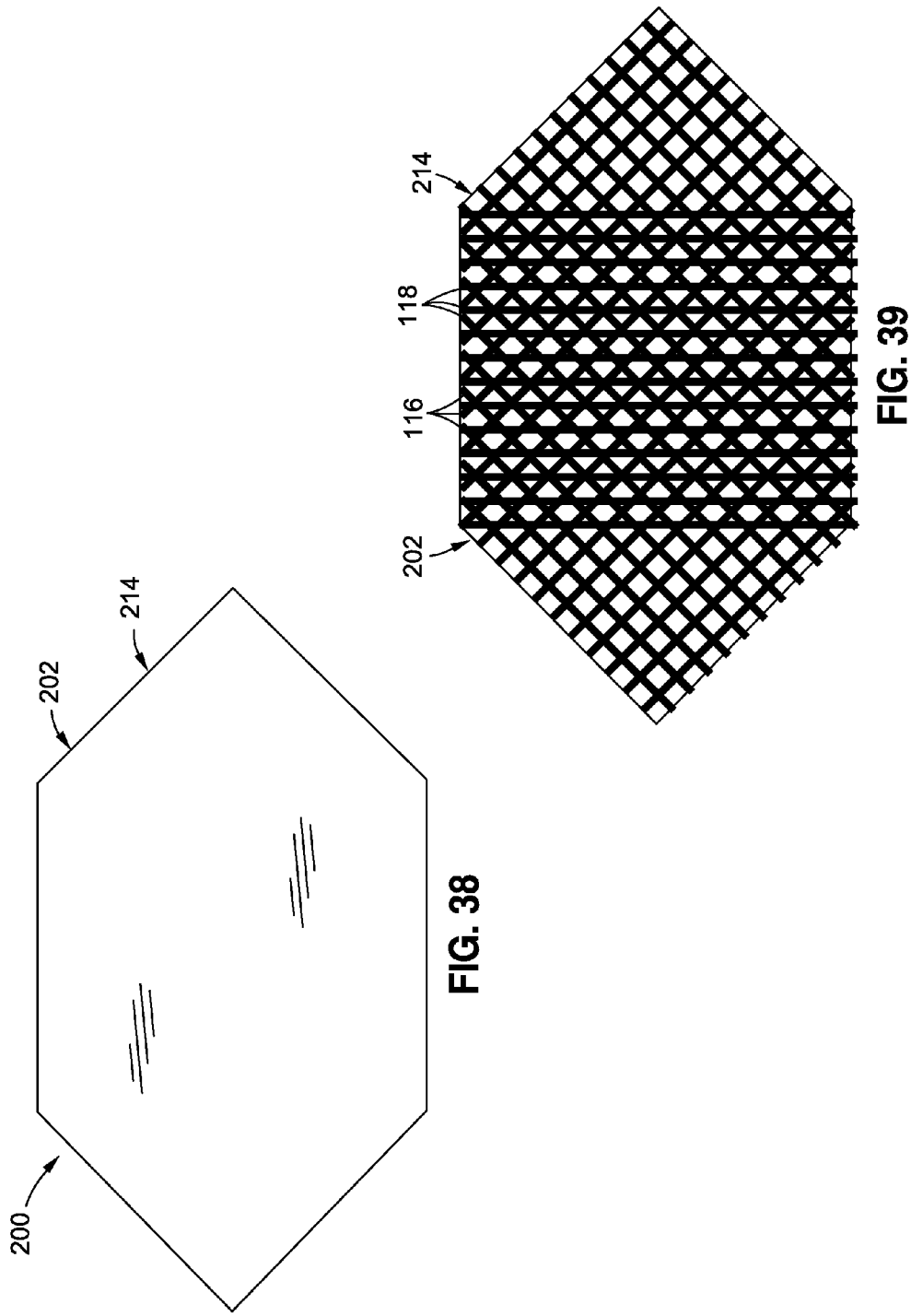

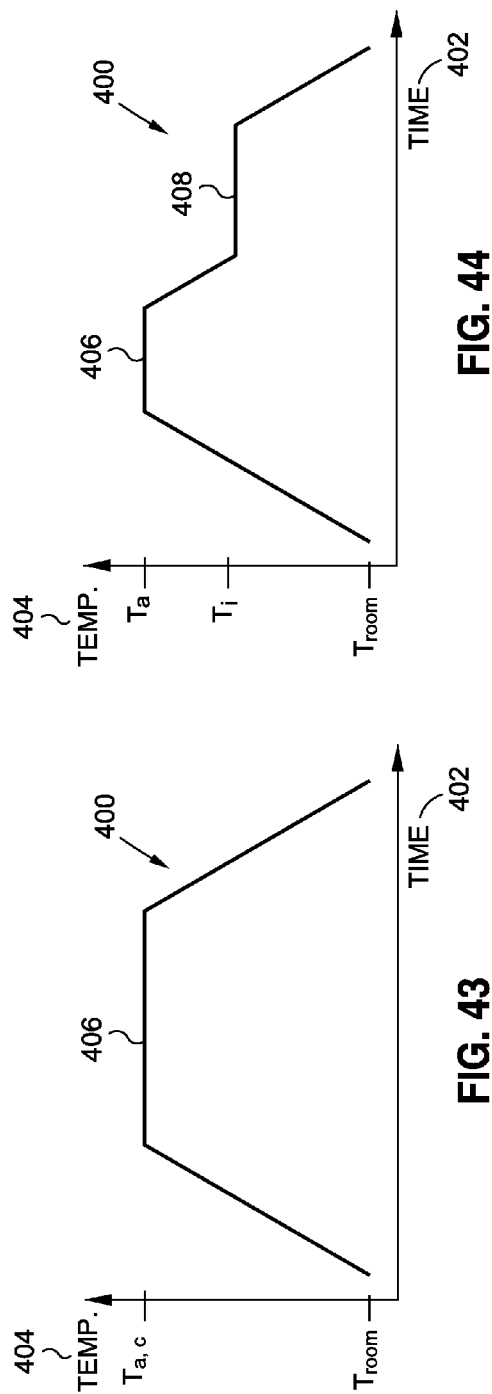

IN-SITU ANNEALING OF POLYMER FIBERS

STATEMENT RE: FEDERALLY SPONSORED RESEARCH/DEVELOPMENT

This invention was made with government support under Department of Defense Contract No. W911W6-10-2-0005. The government has certain rights in the invention.

FIELD

The present disclosure relates generally to composite materials and, more particularly, to the manufacturing of composite articles containing stretched polymer elements.

BACKGROUND

Stretched polymer fibers have significantly higher mechanical properties than non-stretched fibers. For example, stretched polymer fibers may have a significantly higher elastic modulus and significantly higher strength than non-stretched polymer fibers formed of the same material. Conventional methods of forming stretched fibers including drawing fibers during an in-line fiber drawing process while maintaining the fibers at an elevated temperature. The fibers may be maintained at an elevated temperature by passing the fibers through an oven during an annealing process.

The fibers must be held at the elevated temperature for a sufficiently long residence time to avoid partially annealing the fibers. Partially annealed fibers present the risk of fiber snap-back or shrinkage during thermal cycling such as may occur due to temperature changes in the operating environment of an article containing the fibers. Snap-back of the fibers may result in a reduction in the mechanical properties of the fibers and the composite structure. Unfortunately, the relatively long residence time during which the fibers must be held at an elevated temperature limits the throughput or rate at which stretched fibers may be produced. Increasing the fiber drawing speed to increase fiber throughput requires a longer oven to maintain the same residence time. Unfortunately, increasing the length of an oven is cost-prohibitive.

As can be seen, there exists a need in the art for a system and method for a method of producing stretched fibers for composite articles in a timely and cost-effective manner.

SUMMARY

The above-noted needs associated with manufacturing stretched fibers are specifically addressed by the present disclosure which provides a method of manufacturing a composite article containing stretched polymer elements. The method may include attaching a polymer element to a tool. The polymer element may be pre-stretched prior to attachment to the tool. The method may further include annealing the polymer element at a predetermined temperature while constraining a length of the polymer element using the tool. In addition, the method may include curing or solidifying resin associated with the polymer element. The annealing step may be performed prior to the curing or solidifying step. Alternatively, the annealing step may be performed concurrently with the curing or solidifying step.

In a further embodiment, disclosed is a method of manufacturing a polymer-element-reinforced composite article. The method may include attaching the polymer element to a tool. The polymer element may be pre-stretched prior to attachment to the tool. The method may further include infusing the polymer element with resin while the polymer element is attached to the tool. Additionally, the method may include heating the polymer element-resin-tool assembly by placing the polymer element-resin-tool assembly into an oven, and annealing the polymer element while constraining a length of the polymer element using the tool. The method may also include curing or solidifying the resin. The annealing step and the curing or solidifying step may be performed sequentially or concurrently.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 1 is a perspective view of an example of an armor panel including a monolithic strike face, a back face, and a composite layer sandwiched between the strike face and the back face and wherein the composite layer includes stretched polymer fibers embedded in resin;

FIG. 2 is an exploded view of the composite structure of FIG. 1 and illustrating the stretched polymer fibers that make up the composite layer sandwiched between the strike face and the back face;

FIG. 3 is an exploded view of the composite layer showing the stretched polymer fibers arranged in a cross-ply configuration;

FIG. 4 is a perspective view of a portion of the stretched-polymer-fiber composite layer taken along line 4 of FIG. 2;

FIG. 5 is a sectional view of the composite layer taken along line 5 of FIG. 4 and illustrating an examples of a cross-sectional shape of the stretched polymer fibers;

FIG. 13 is a top view of the fiber-wrapped zero-expansion tool in the oven taken along line 13 of FIG. 12 and illustrating the heating of the tool and polymer fibers during an annealing process;

FIG. 14 is a top view of an example of a differentially-expanding tool wrapped with stretched fibers and configured to impart additional stretching of polymer fibers oriented in one direction and allowing for snap-back of polymer fibers oriented in another direction;

FIG. 15 is a top view of an example of a bi-directionally expanding tool wrapped with stretched fibers and having an isotropic coefficient of thermal expansion (CTE) and configured to impart additional stretching of the polymer fibers in two directions;

FIG. 16 is a top view of the fiber-wrapped tool of FIG. 15 following the expansion of the tool and the additional stretching of the polymer fibers for subsequent annealing;

FIG. 18 is a perspective view of an example of a cross-ply configuration of an annealed polymer fiber composite article following removal from the tool;

FIG. 19 is a perspective view of a further example of an annealed polymer fiber composite article bonded to the tool (e.g., a fly-away tool) for use in a final composite structure;

FIG. 20 is a perspective view of an example of a composite article formed of bi-directionally stretched woven fabric annealed in a manner similar to that shown in FIGS. 7-12 and 15-17;

FIG. 21 is a perspective view of an example of a composite article formed of unidirectionally stretched thin polymer film annealed in a manner similar to that shown in FIGS. 7-12 and 14;

FIG. 22 is a cross-sectional view taken along line 22 of FIG. 21 and illustrating the geometric modification of the annealed film to form weakened portions for locally reducing the strength of the film along a direction transverse to the stretched direction;

FIG. 23 is a top view of an example of a tool configured as a pair of parallel beams;

FIG. 24 is a top view of polymer fibers wrapped around the pair of beams of FIG. 23 prior to annealing and resin infusion of the polymer fibers;

FIG. 25 is a sectional view taken along line 25 of FIG. 24 and illustrating resin infused into the polymer fibers and filling the space between the upper and lower wraps of polymer fibers;

FIG. 26 is a side view of a pair of composite articles each comprising annealed polymer fibers embedded in resin and formed using the parallel beams;

FIG. 27 is a top view of a further example of a tool configured as a frame having a hollow frame interior;

FIG. 28 is a top view of polymer fibers wrapped around the frame of FIG. 27 in a cross-ply arrangement prior to annealing and resin infusion of the polymer fibers;

FIG. 29 is a sectional view taken along line 29 of FIG. 28 and illustrating resin infused into the polymer fibers and filling the hollow frame interior;

FIG. 32 is an end view of the pair of beams taken along line 32 of 31 and illustrating a nested arrangement of the fiber-wrapped beams of FIGS. 30-31;

FIG. 33 is a end view of a consolidated composite article formed using the nested fiber-wrapped beams of FIG. 32;

FIG. 34 is an end view of a tool illustrating a stacked arrangement of the fiber-wrapped beams of FIGS. 32-33;

FIG. 35 is an end view of a consolidated composite article formed using the stacked fiber-wrapped beams of FIG. 34;

FIG. 38 is a top view of an example of a hexagonally-shaped tool;

FIG. 39 is a top view of polymer fibers wound around the hexagonally-shaped shape tool along three fiber angles;

FIG. 43 is a graph illustrating an example of a thermal cycle that may be implemented for annealing and curing or solidifying a composite article;

FIG. 44 is a graph illustrating an example of a thermal cycle that may be implemented for annealing polymer elements and solidifying thermoplastic resin of a composite article;

FIG. 45 is a graph illustrating an example of a thermal cycle that may be implemented for annealing the polymer elements and curing thermosetting resin of a composite article.

DETAILED DESCRIPTION

Figure 6:
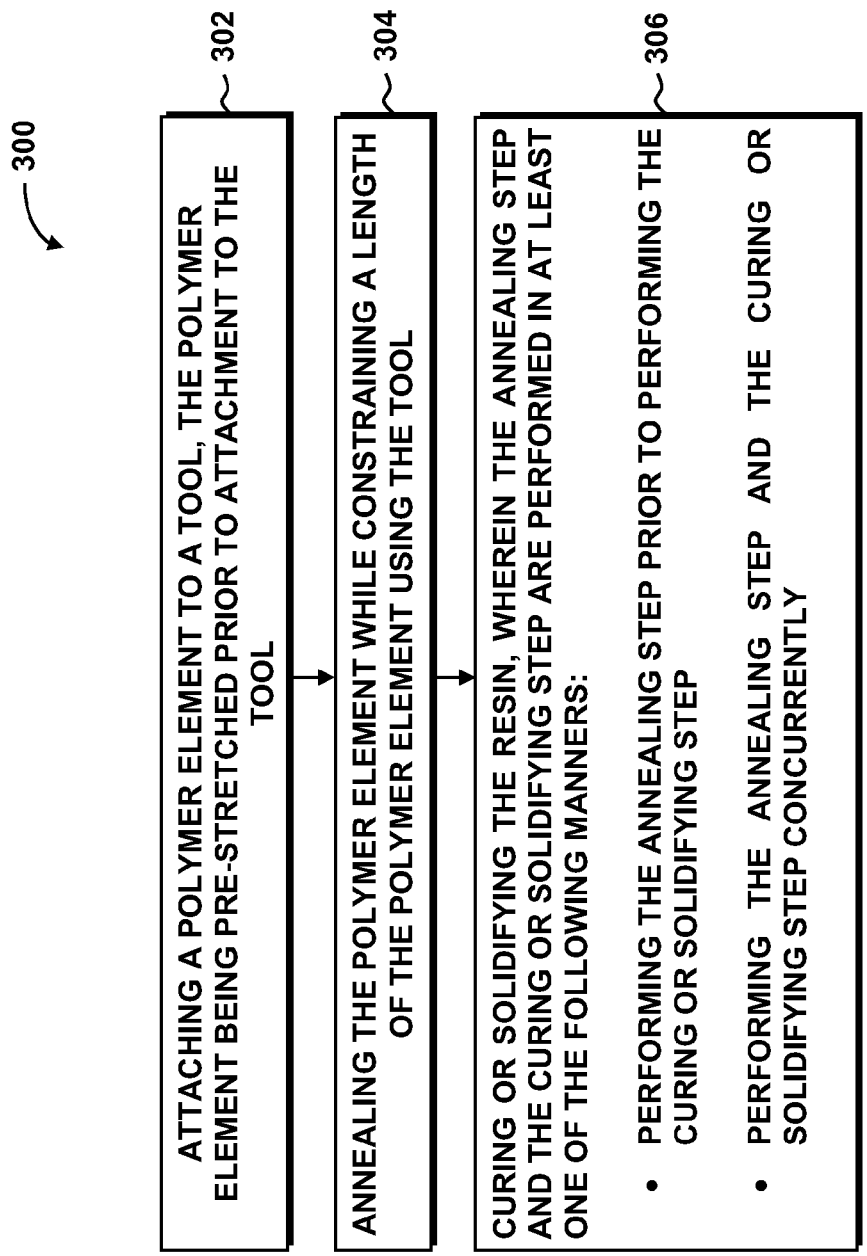
FIG. 6 is a flowchart illustrating one or more operations that may be included in a method of manufacturing a composite article containing one or more stretched polymer elements.

Referring now to the drawings wherein the showings are for purposes of illustrating various embodiments of the disclosure, shown in FIG. 1 is an example of a composite structure 100 that may include stretched polymer fibers 118. In the example shown, the composite structure 100 may be configured as a substantially optically transparent ballistic panel 102 or armor panel having a monolithic strike face 104, a back face 106, and a composite layer 110 sandwiched between the strike face 104 and the back face 106 similar to the ballistic panel disclosed in application Ser. No. 12/969,532 filed on Dec. 15, 2010, and entitled SANDWICHED FIBER COMPOSITES FOR BALLISTIC APPLICATIONS to Wilenski et al., the entire contents of which is incorporated herein by reference. In an example not shown, a ballistic panel 102 may include composite layer 110 as the back face 106. Even further, a ballistic panel 102 may include more than three (3) layers, any one or more of which may be a composite layer 110. In FIG. 1, the composite layer 110 may include annealed, stretched polymer fibers 118 embedded in resin 114. The annealed, stretched fibers 118 in the composite layer 110 may significantly improve the ballistic performance of the armor panel relative to composite layers 110 formed of non-stretched fibers.

Disclosed herein is a method for producing composite articles 108 containing annealed polymer fibers 118 such as the example composite layer 110 shown in FIG. 1. The method provides a means for annealing polymer elements 116 that may be pre-stretched in a separate process prior to the annealing process disclosed herein. In one example, polymer elements 116 may be polymer fibers 118 that may be pre-stretched during a fiber-drawing process. For example, such a fiber-drawing process may include extruding un-stretched fiber (not shown) and quenching the fiber in a water bath. The extruded fiber may then be stretched in an oven at a predetermined temperature by imparting a predetermined strain on the fiber or by stretching the fiber to a predetermined length. The stretched fiber may have significantly improved mechanical properties relative to non-stretched fibers. The improved mechanical properties as a result of stretching a polymer element 116 may include, but are not limited to, increased strength, increased modulus, improved refractive index, and other improved properties relative to an unstretched polymer element formed of the same material.

The method disclosed herein allows for annealing of the pre-stretched fibers 118 during the fabrication of a composite article 108 such as a composite layer for use in a ballistic panel 102. The annealing of the pre-stretched fibers 118 may eliminate or prevent thermally induced snap-back of the stretched fibers 118. The method advantageously allows for manufacturing annealed or thermally-stable stretched-polymer-fiber composite articles 108 in a reduced amount of time relative to the total time required to separately prepare stretched, annealed fibers 118, and then infusing the fibers 118 with resin and curing or solidifying the resin in a separate operation. In addition, the method provides a means for fabricating annealed, stretched-polymer-element composite articles 108 in a cost-effective manner. In one example, the method provides a means for preparing annealed, stretched-polymer-element composite articles 108 by annealing the polymer elements 116 on a tool 202 either before or during resin cure (e.g., thermoset resin) or solidification (e.g., thermoplastic resin) using the same tool 202, as described in greater detail below.

Although the method is described in the context of manufacturing a generally flat composite layer 110 containing annealed, stretched polymer fibers 118 as shown in FIGS. 2-5 and 7-17, the method may be implemented for manufacturing composite articles 108 containing annealed polymer elements 116 such as annealed fiber tows, annealed woven fabric 124 (FIG. 18), annealed unidirectional tape, annealed unidirectional sheet, annealed polymeric film 126 (FIG. 19), annealed braided fibers, and any one of a variety of other polymer element configurations. In the present disclosure, the method provides a means for annealing polymer elements 116 that may be unidirectionally stretched, bi-directionally stretched (e.g., bi-axially stretched along two mutually perpendicular directions), or stretched in more than two (2) different directions. For example, the method allows for annealing a stretched polymer film 126 such as a unidirectionally stretched film or a bi-directionally stretched film. The method may be implemented for manufacturing composite articles 108 of any one of a variety of different sizes, shapes, and configurations, and for use in any one of a variety of applications, and is not limited to manufacturing substantially flat or planar composite layers 110 for ballistic panels 102. In one example, the method may be implemented for manufacturing annealed, stretched-polymer-element composite articles that have singly-curved surfaces, doubly-curved surfaces, contoured surfaces, or any combination of curved and planar surfaces.

FIG. 2 is an exploded perspective view of the composite structure 100 of FIG. 1 and shows a composite layer 110 sandwiched between the strike face 104 and the back face 106. The strike face 104 may be formed as a monolithic panel comprised of material having relatively high hardness such as ceramic and/or glass. The back face 106 may act as a spall layer for the ballistic panel 102 and may be formed of a material having relatively low stiffness such as polycarbonate. The strike face 104, the back face 106, and/or the composite layer 110 may be substantially optically transparent in the visible spectrum and/or the infrared spectrum. Alternatively, the strike face 104, the back face 106, and/or the composite layer 110 may be opaque.

FIG. 3 is an exploded perspective view of the composite layer 110 showing two (2) plies or layers of annealed, stretched polymer fibers 118 arranged in a cross-ply configuration 122. The polymer fibers 118 may be stretched along a stretched direction 262 and may be annealed using the method disclosed herein. The fibers 118 in each layer or ply are shown as being substantially parallel to one another. The fibers 118 in one layer or ply are oriented perpendicularly relative to the fibers 118 in the other layer.

FIG. 4 shows a portion of the stretched-polymer-fiber composite layer 110. Although two (2) layers of fibers 118 are shown, the method disclosed here may be implemented for forming a composite article 108 having any number layers or plies of annealed, stretched fibers 118 or annealed, stretched polymer elements 116. In addition, the annealed, stretched fibers 118 in one layer may be oriented in any direction relative to the annealed, stretched fibers 118 in other layers. The composite article 108 may include opposing assembly surfaces 112 which may be oriented parallel to one another which may improve the optical quality of the composite article 108.

FIG. 5 is a sectional view of the composite layer 110 showing a cross-section of the annealed, stretched polymer fibers 118 embedded within resin 114. The polymer fibers 118 are shown having a generally elongated cross-sectional shape with a flattened or substantially planar upper surface 150 and/or lower surface 152 to minimize bending or refracting of light that may otherwise occur when light passes through a curved surface. In addition, the polymer fibers 118 may be oriented such that the upper surface 150 and/or lower surface 152 of the fibers 118 are generally parallel to the assembly surfaces 112 of the composite article 108 to improve optical performance. The polymer fibers 118 and/or resin 114 may be formed of material that is substantially optically transparent in the visible and/or infrared spectrum.

The generally elongated cross-sectional shape of the stretched fibers 118 preferably has a relatively high aspect ratio which may be described as the ratio of fiber width 156 to fiber thickness 154. In one example, the stretched fibers 118 may have an aspect ratio of from approximately 1-500. Stretched polymer elements 116 or fibers 118 may be provided in a fiber thickness of 5-5000 microns, although the stretched polymer elements 116 may be provided in other thicknesses. Each fiber 118 may be comprised of a bundle of up to several thousand or more reinforcing filaments each having a thickness of up to 10 microns. Although the polymer elements 116 (e.g., fibers 118) are illustrated as having a generally flattened shape with a substantially planar upper surface 150 and/or lower surface 152, other shapes are contemplated. For example, polymer fibers 118 may be provided in a variety of alternative cross-sectional shapes including a square, a triangle, a rounded shape, or other cross-sectional shapes.

FIG. 6 is a flowchart illustrating one or more operations that may be included in a method 300 of manufacturing a composite article 108 containing one or more stretched polymer elements 116. The method 300 may be implemented for fabricating a polymer-element-reinforced composite article 108 containing polymer elements 116 in one or more forms. For example, as indicated above, the polymer elements 116 may be provided as fibers, unidirectional tape, woven fabric, braided fibers, thin polymer films, and any other type or form of polymer element that may be stretched and incorporated into a composite article 108. In the present disclosure, the polymer element 116 and/or the resin 114 may be formed of thermoplastic material or thermosetting material. Thermoplastic material may include acrylics, fluorocarbons, polyamides, polyolefins, polyesters, polycarbonates, polyurethanes, polyaryletherketones, polyetherimides, polyethersulfone, polysulfone, and polyphenylsulfone. Thermosetting material may include polyurethanes, phenolics, polyimides, sulphonated polymer, a conductive polymer, benzoxazines, bismaleimides, cyanate esthers, polyesters, epoxies, and silsesquioxaness. The polymer elements 116 may also be formed of polyoxymethylene (POM), and/or polyethylene including ultra-high molecular weight polyethylene (UHMWPE).

Step 302 of the method 300 may include attaching a stretched polymer element 116 to a tool 202 in a manner to constrain a length of the polymer element 116. As indicated above, the polymer element 116 may be pre-stretched using a separate stretching process (not shown) prior to attachment of the polymer element 116 to the tool 202. In the separate stretching process, a polymer element 116 may be stretched to a stretched configuration such as to a predetermined stretched length, or to a predetermined strain level. For example, a polymer element 116 may be stretched to a length that is at least 10% greater than an unstretched, original length of the polymer element 116. In some examples, a polymer fiber 118 may be pre-stretched to at least twice its original unstretched length. In other examples, a polymer fiber 118 may be stretched up to seven times its original unstretched length.

In a further embodiment described below, the presently disclosed method may include imparting additional stretch into a polymer element 116 after the polymer element 116 is attached to the tool 202. For example, polymer elements 116 may be passively stretched using the tool 202 which may also function as a fiber stretching apparatus 200. For example, polymer elements 116 may be mounted to a panel 214 formed of material having a coefficient of thermal expansion (CTE) selected such that when the panel 214 is heated to an annealing temperature of the polymer element 116, the panel 214 expands along at least one direction and resulting in additional stretching of the polymer elements 116. In another example, additional stretching may be imparted to polymer elements 116 using a fiber stretching apparatus 200 having one or more stretching actuators (not shown).

Step 304 of the method 300 may include annealing the polymer element 116 at one or more elevated temperatures for a predetermined time period while constraining a length 117 (FIG. 11) of the polymer element 116 using the tool 202. In this regard, the method may include maintaining the polymer element 116 in the stretched configuration and constraining the polymer element 116 against shrinkage during a thermal cycle up to and at an annealing temperature. The length of the polymer element 116 may be constrained by maintaining the polymer element at a specific stretched length using the tool 202, or by maintaining the polymer element 116 at a specific strain using the tool 202, as described below. The polymer element 116 may be heated to an annealing temperature during a thermal cycle of the annealing process. During the annealing process, the temperature of the polymer element 116 may be varied between the annealing temperature and other lower temperatures. The annealing process may set the orientation of the molecules in the pre-stretched polymer element 116, and may thereby lock in the improved mechanical properties of the polymer element 116 as a result of the stretching of the polymer element 116. The annealing process may limit or prevent thermally induced snap-back in the polymer element 116 which may otherwise occur during thermal cycling in the operating environment of the final composite structure 100.

Step 306 of the method 300 may include applying resin to the polymer element 116. Resin may be applied to the polymer element 116 prior to attaching the polymer element 116 to the tool 202. For example, resin may be applied to polymer fibers 118 such as unidirectional tape, woven fabric, and/or braided fibers in a pre-pregging operation. Even further, resin may be co-extruded with polymer fibers 118 in in a desired cross-sectional shapes, similar to the ballistic panel disclosed in application Ser. No. 13/523,087 filed on Jun. 14, 2012, and entitled FORMATION OF A SHAPED FIBER WITH SIMULTANEOUS MATRIX APPLICATION to Wilenski et al., the entire contents of which is incorporated herein by reference. Alternatively, resin 114 may be applied to one or more polymer elements 116 during the process of attaching the polymer elements 116 to a tool 202, and prior to annealing the polymer elements 116. For example, resin 114 may be sprayed onto polymer fibers 118 as the fiber layers are wound around a tool 202 or panel 214. In other examples, the application of resin 114 to the polymer element 116 may include infusing the polymer element 116 with liquid resin 114 such as by applying vacuum pressure to a bag assembly (e.g., see FIG. 17) sealing a fiber-wrapped tool 202 to a mandrel. Even further, one or more layers of resin film (not shown) may be laid up with one or more polymer elements during or after attachment of the polymer element 116 to the tool 202. The application of heat to the resin film may reduce the resin viscosity allowing the resin to infuse into the polymer elements 116.

The step of infusing the polymer element 116 with resin 114 may include at least partially embedding a polymer element 116 in resin 114, and may also include applying a coating or layer of resin 114 to one or more surfaces of a polymer element 116. As described below, the step of infusing a polymer element 116 with resin 114 may include infusing resin 114 into stretched fibers 118 and/or into stretched woven fabric 124. In a further example, the step of infusing a polymer element 116 with resin 114 may include applying a coating of resin 114 to at least one surface of a stretched polymer film 126. In this regard, the method may include any suitable process for the application of resin 114 to any one of a variety of different types of stretched polymer elements 116.

The method may additionally include curing thermosetting resin or solidifying thermoplastic resin 114. Advantageously in the present disclosure, the annealing step may be performed with the polymer element 116 mounted to a tool 202. In some examples, the annealing step may be performed prior to curing or solidifying the resin 114 while the polymer element 116 is mounted to the same tool 202. After annealing the polymer element 116, the resin 114 may be cured at a cure temperature that may be less than the annealing temperature in order to avoid snap-back of the polymer element 116 which may otherwise occur if the curing temperature exceeds the annealing temperature. In some examples, the polymer element may be removed from the tool 202 after annealing the polymer element and prior to curing or solidifying the resin 114.

As an alternative to performing the curing or solidifying step after the annealing step, the annealing step and the curing or solidifying step may be performed concurrently. For example, the annealing step and the curing or solidifying step may be performed while the polymer element 116 is mounted to the same tool 202. As described in greater detail below, the method may include mounting one or more polymer elements 116 to a tool 202, infusing the polymer elements 116 with resin 114, annealing the polymer element 116 and curing or solidifying the resin 114 concurrently. The polymer element 116 may be infused with resin 114 prior to or during the heating of the tool 202 and polymer element 116 to the annealing temperature. A polymer element 116 may be infused with resin 114 during the heating of the tool 202 and annealing of the polymer element 116. In one example, the steps of annealing, infusing, and curing may be performed with the polymer element 116 mounted on the same tool 202.

Regardless of whether the annealing and curing steps are performed sequentially or concurrently, the method disclosed herein may result in an annealed polymer element 116 that is thermally stable at the cure temperature, at the resin infusion temperature (e.g., which may be below cure temperature), and at the application temperature of the operating environment in which the polymer element 116 will be used. Thermal stability of the stretched polymer elements 116 may be described as the resistance of the stretched polymer elements 116 to snap-back. Snap-back may be described as the at least partial reversion of the polymer element back to its pre-stretched mechanical properties. Advantageously, the method may allow for annealing the stretched polymer elements 116 while the resin 114 is curing or solidifying, thereby reducing the total number of steps required to manufacture an annealed, stretched-fiber-reinforced composite article 108. As a result, the total manufacturing time for the composite article 108 may be reduced. In addition, composite articles 108 manufactured using the method disclosed herein may exhibit increased physical properties such as increased toughness in addition to the improved mechanical properties of strength and modulus.

Figure 7:
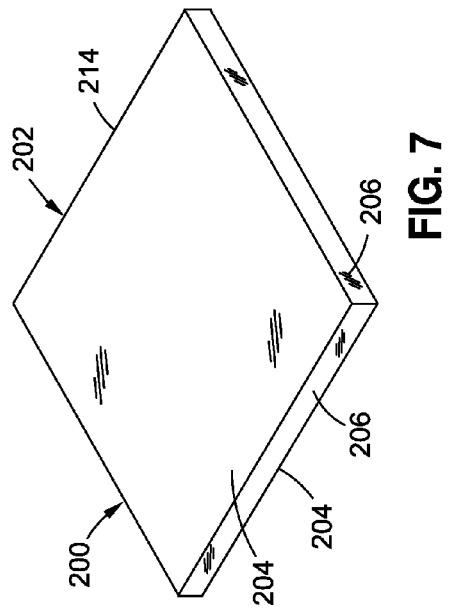
FIG. 7 is a perspective view of an example of an example of a tool configured as a panel that may be used for annealing pre-stretched polymer elements such as polymer fibers.

FIG. 7 is a perspective view of an example of a tool 202 configured as a panel 214 having upper and lower tool surfaces 204 and side edges 206 extending around a perimeter of the tool 202 or panel 214. The panel 214 may be used for annealing one or more pre-stretched polymer elements 116. In addition, the tool 202 may be also implemented as a fiber stretching apparatus 200 for imparting additional stretch into a pre-stretched polymer element prior to annealing the polymer element 116. In the illustration shown, the polymer element 116 is configured as a polymer fiber 118. However, the tool 202 and method disclosed herein may be implemented for annealing any one of a variety of different types of polymer elements 116 as indicated above, including, but not limited to, unidirectional tape, woven fabric, thin polymer films, and other polymer element configurations.

Although the tool 202 in FIG. 7 is shown as a planar, solid panel 214 having a generally orthogonal shape with planar surfaces, the tool 202 may be provided in any one of a variety of shapes and curvatures. For example, the tool 202 may be formed as a panel 214 in the shape of a rectangle, a triangle, or other geometric shapes. In addition, the tool 202 may be formed in a non-planar shape such as a cube, a pyramid, or in non-orthogonal shapes. In some examples, the tool 202 may have one or more convexly-curved surfaces (not shown) which the polymer fibers 118 may contact when applied to the panel 214. The tool 202 may be shaped to stretch the polymer element 116 into a stretched configuration during the annealing step. The shape of the tool 202 may be selected to help control the stretching and/or straining of the polymer elements 116 in accordance with the required annealing temperatures. The tool 202 may be provided with one or more tool surfaces 204 against which the polymer element 116 bears such that when the resin 114 is cured or solidified under pressure, the polymer element 116 retains the shape or contour of one or more tool surfaces 204.

The tool 202 may be formed of a tool material having a tool CTE designed to cause the tool 202 to maintain the polymer element 116 in the stretched configuration during thermal cycling up to and at the annealing temperature. In this regard, the thermal cycle may be selected to impart a specific residence time, temperature, and/or strain cycle to the polymer element 116. In the present disclosure, the step of maintaining the polymer element 116 in the stretched configuration may include maintaining the polymer element 116 at a specific stretched length of the polymer element 116, or maintaining the polymer element 116 at a specific strain (e.g., a fixed fiber strain) such as at zero strain during annealing. The polymer element may be attached to the tool 202 in a manner such that the tool 202 constrains the length and/or prevents shrinkage of the polymer element during annealing. In any of the embodiments disclosed herein, the tool 202 may be configured to constrain the length of the polymer element 116 during thermal cycling up to and including the annealing temperature, or the tool 202 may be configured to maintain a specific strain (e.g., zero strain) in the polymer element 116 during the thermal cycling of the annealing process.

The tool 202 may be formed of any metallic and/or non-metallic material having the appropriate CTE such that when heated to the annealing temperature, the tool 202 maintains the polymer element 116 in the stretched configuration throughout a predetermined residence time during the thermal cycling of the annealing process. In some examples, the tool 202 may have a relatively low CTE such that the tool 202 may be described as a zero-expansion tool 242 (FIG. 13). The tool 242 may be formed of a tool material (e.g., Invar™, Zerodur™, glass, silica, etc.) having negligible expansion when heated to the annealing temperature of the polymer element. In other examples, the tool 202 may be selected to have a controlled CTE to impart additional stretch to a polymer element 116 in response heating of the tool 202. The tool material may be selected to cause expansion of the tool 202 along any one of a plurality of desired directions such as along any one or more fiber orientations of the fibers 118 that may be wrapped around the tool 202. A tool 202 may be configured to impart unidirectional stretching 264 into a polymer element 116. In other examples, a tool 202 may be configured to impart bi-directional stretching into a polymer element 116. In any of the embodiments disclosed herein, the tool material may be selected to have a desired combination of CTE, temperature stability, modulus, and strength, and may further include other characteristics such as part smoothness and environmental stability.

Non-limiting examples of materials for the tool 202 include metal (e.g., aluminum), glass, ceramic, glass-ceramic, crystals, polymeric material including glass-fiber-reinforced polymeric material (GFRP), carbon-fiber-reinforced polymeric material (CFRP), foam, honeycomb, and nano-structured material, micro-structured material, or macro-structured material, or any other suitable material, including materials that may be included in a final composite structure (e.g., a fly-away tool). In one example, the tool 202 may be configured as a monolithic panel 214 of glass and/or a thermoplastic material such as polycarbonate. For certain applications, it may be desirable to form the monolithic panel 214 of material that is substantially optically transparent to visible light and/or infrared light such that after resin cure or solidification, the tool 202 may be retained with the stretched annealed polymer element 116 to form a polymer element-tool assembly 268 (FIG. 19) that may be incorporated into a final composite structure 100 such as a transparent ballistic panel 102 (FIGS. 1-2).

Figure 8:
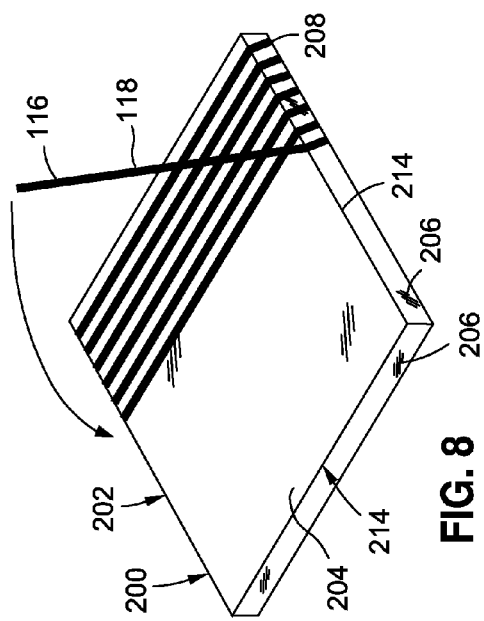
FIG. 8 illustrates the attachment of a polymer fiber to the tool (e.g., the panel) and the wrapping of the polymer fiber around the tool along a first direction.

FIG. 8 illustrates the attachment of a polymer fiber 118 to the tool 202 (e.g., a panel 214). The polymer fiber 118 may be pre-stretched prior to attachment to the tool 202 using any appropriate fiber stretching process, as indicated above. The method may include attaching the polymer fiber 118 to the panel 214 at a first location 208 of the polymer fiber 118. For example, one end of the polymer fiber 118 may be attached to a side edge 206 near a corner of the panel 214. The polymer fiber 118 may be a continuous fiber 118 that may be wrapped around the upper and lower tool surfaces 204 and side edges 206 along a first direction.

Figure 9:
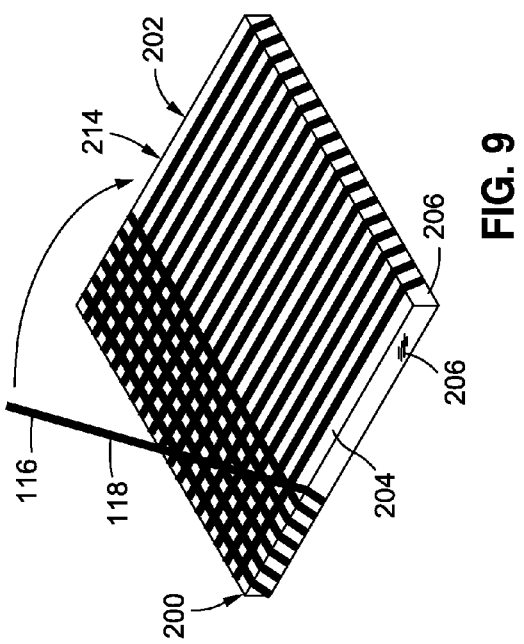
FIG. 9 illustrates the wrapping of a polymer fiber around the tool along a second direction transverse to the first direction.

FIG. 9 illustrates the wrapping of the polymer fiber 118 around the tool 202 along a second direction transverse to the first direction. The polymer fiber 118 may be attached to the tool 202 at one or more locations. For example, the polymer fiber 118 may be attached to the upper and/or lower surfaces or faces of the tool 202 such as along the perimeter, and/or to one or more side edges 206 of the tool 202. An end of the polymer fiber 118 may be attached to the upper and/or lower surfaces or faces of the tool 202 or side edge 206 of the tool 202 at a second location 210 to complete the fiber wrapping process and constrain the length of the polymer fiber.

Figure 10:
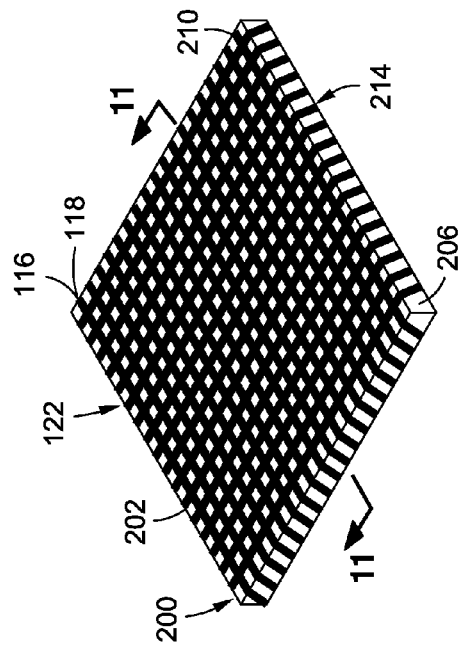
FIG. 10 illustrates the tool completely wrapped by polymer fibers in a cross-ply configuration.

FIG. 10 illustrates the tool 202 completely wrapped by the polymer fiber 118 to form a cross-ply configuration 122. The polymer fiber 118 may be attached to the panel 214 in a manner that the length of polymer fiber 118 is constrained during annealing. For example, the length of each fiber wrap may be constrained against shrinkage by attaching the end of the polymer fiber wraps to the side edges of the panel 214. As indicated above, the tool 202 may be formed of a material having a relatively low CTE such that the tool may be described as a zero-expansion tool 242 (FIG. 13). Alternatively, the tool 202 may have a CTE resulting in expansion of the tool 202 (FIGS. 14-16) when heated and thereby imparting additional stretch into the polymer fibers 118. In some examples, the tool 202 may have a CTE that is isotropic (e.g., see FIG. 15-16). However, the tool 202 may be formed of material that is non-isotropic or has a CTE that is directional (e.g., see FIG. 14), as indicated above. For example, the tool 202 may be formed of material that has a higher CTE along one direction, and a reduced CTE along a direction transverse to the direction of higher CTE.

Figure 11:
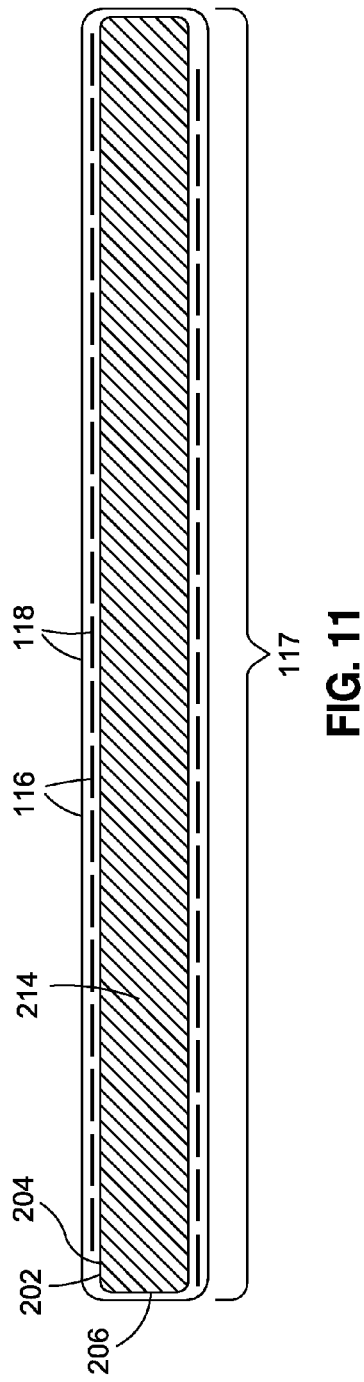
FIG. 11 is a sectional view of the fiber-wrapped tool taken along line 11 of FIG. 10.

FIG. 11 is a sectional view of the fiber-wrapped tool 202 of FIG. 10, and showing a length 117 of the polymer fiber 118 that may be constrained by the tool 202. The upper tool surface 204 supports a cross-ply configuration 122 of polymer fibers 118. Likewise, the lower tool surface 204 supports a cross-ply configuration 122 of polymer fibers 118. In the example shown, a single polymer fiber 118 may be wrapped around the tool 202 to form the cross-ply configuration 122. However, any number of polymer fibers 118 may be wrapped around the tool 202 to form any number of layers or composite plies on the upper and lower surface of the tool 202. In some examples, individual polymer fibers 118 may be wrapped in partial or complete revolutions around the tool 202.

Figure 12:
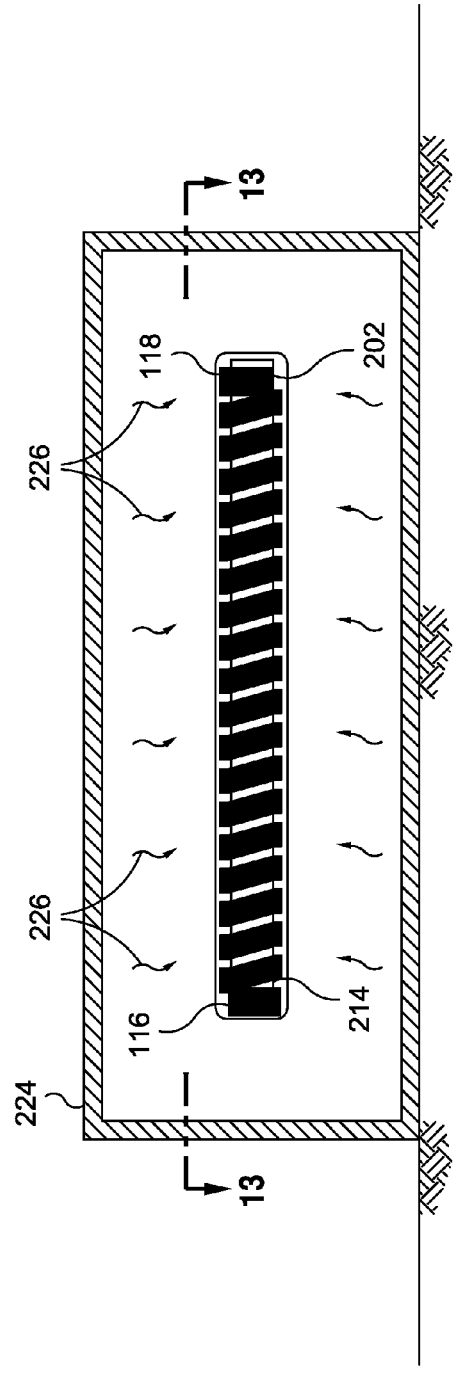
FIG. 12 is a side view of the fiber-wrapped tool installed in an oven and wherein the tool is a zero-expansion tool having substantially zero or negligible expansion when heated to an annealing temperature.

FIG. 12 is a side view of the fiber-wrapped tool 202 installed in an oven 224. Alternatively, the fiber-wrapped tool 202 may be installed in an autoclave or other heating device. In this regard, any suitable device may be implemented for heating the tool 202 and the polymer element 116 during a prescribed thermal cycle. Heat 226 may be applied in any one of a variety of different manners. For example, an oven 224 may include a heating device such as one or more resistive heating elements. Heat 226 may also be applied using infrared heating, induction heating, convection heating, or other types of heating. However, the method allows for heating the fiber-wrapped tool 202 in any suitable manner, and is not is not limited to installing the fiber-wrapped tool 202 in an oven or autoclave.

FIG. 13 is a top view of the fiber-wrapped tool 202 in the oven 224. In the example shown, the tool 242 may be configured as a zero-expansion tool 242 having relatively low or negligible expansion when heated to an annealing temperature. FIG. 13 illustrates the annealing of the pre-stretched polymer fibers 118 during the application of heat 226. The tool 242 may constrain the polymer fibers 118 against shrinkage during the annealing process. The polymer fibers 118 may be maintained at a prescribed annealing temperature over a relatively long period of time to lock in the improved mechanical properties of the stretched polymer fibers 118.

FIG. 14 is a top view of an example of a differentially-expanding tool 244 wrapped with pre-stretched fibers 118 and illustrating the application of heat to the fiber-wrapped tool 244. The tool 244 may be formed of a tool material having non-isotropic CTE or differential CTE causing differential expansion 228 of the tool 244 when heated. The tool may be a unidirectional tool 244 configured to impart additional stretch in different amounts in different directions of the polymer element. For example, the tool 244 may be configured to impart additional stretch to the polymer fibers 118 in the 0-degree direction, and may allow a relatively small amount of shrinkage or snap-back of the polymer fibers 118 in the 90-degree direction. A relatively small amount of shrinkage in the polymer fibers 118 may result in a reduction in the stiffness or modulus in the snap-back direction.

FIG. 15 is a top view of a fiber-wrapped tool formed of a tool material having an isotropic CTE. The tool may be a bidirectional tool 246 configured to impart bi-directional stretching to one or more polymer elements 116. FIG. 16 illustrates the annealing of the polymer fibers 118 during the application of heat 226. In the example shown, the thermally-induced expansion 228 of the tool 246 may impart bi-directional stretching of the cross-ply configuration of polymer fibers 118 along the noted stretched directions 262 which are parallel to the fibers 118. The polymer fibers 118 may be maintained at a prescribed annealing temperature over a predetermined period of time.

Figure 17:
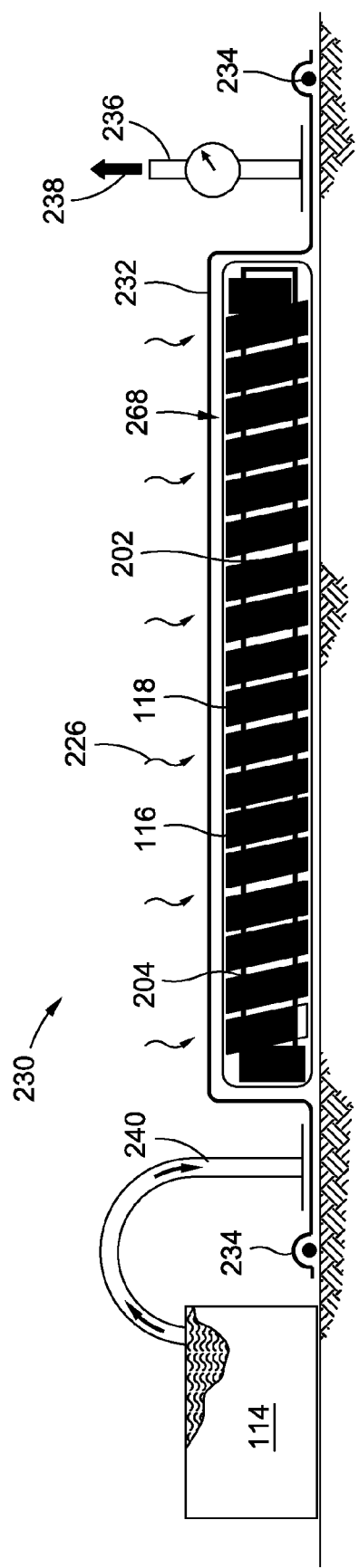
FIG. 17 is a side sectional view of a bagging assembly for infusion of resin into the annealed polymer fibers while wrapped around the tool.

FIG. 17 is a sectional view of a bagging assembly 230 that may be implemented for consolidating the stretched polymer fibers 118 and/or infusing resin 114 into the stretched polymer fibers 118 while wrapped around a tool 202. In some examples, a fiber-wrapped tool 202 may be placed on top of a mandrel (not shown). The mandrel surface may be coated with a release film (not shown) to allow for removal of the polymer element/tool assembly after resin curing or solidification. The mandrel surface may be shaped complementary to the lower tool surface 204. In addition to providing an environment for resin infusion, the bagging assembly 230 may also assist in debulking and/or consolidating the polymer elements 116. The bagging assembly 230 may include a breather layer (not shown) and/or a release layer (not shown) that may be applied over the fiber-wrapped tool 202. A non-porous or impermeable bagging film 232 may be sealed to the mandrel around the perimeter of the fiber-wrapped tool 202 using edge sealant 234 such as sealant tape.

The bagging assembly 230 may include at least one vacuum port 236 that may be coupled to a vacuum generator (not shown) such as a vacuum pump for generating vacuum pressure 238 within the enclosure formed by the bagging film 232 sealed to the mandrel. The bagging assembly 230 may include at least one resin infusion port 240 that may be fluidly coupled to a container of liquid resin 114. Application of vacuum pressure 238 to the bagging film 232 may draw resin 114 into the enclosure between the bagging film 232 and the mandrel and causing the resin 114 to infuse into the stretched polymer fibers 118. In addition, the vacuum pressure 238 may facilitate the removal of air and/or other gases from the polymer fibers 118 and may facilitate consolidation to improve the fiber 118 volume fraction of the composite article 108. Resin 114 may be infused into the stretched polymer fibers 118 in other ways, and is not limited to vacuum-assisted resin infusion. For example, a resin film may be applied over the fiber-wrapped tool 202 to provide resin infusion into the stretched polymer fibers 118 under vacuum pressure.

Regardless of the type of resin infusion process that is selected, heat 226 may be applied to the resin 114 and/or the stretched polymer fibers 118 prior to infusing with resin 114 to elevate the temperature to a resin infusion temperature to reduce the viscosity of the resin 114 and thereby facilitate resin flow for infusing the stretched polymer fibers 118 with resin 114 while the polymer fibers 118 remain attached to the tool 202. The resin 114 may be cured at a predetermined cure temperature while the polymer fibers 118 remain attached to the same tool 202 that is used during the annealing process. The cure temperature is preferably less than the annealing temperature to avoid snap-back or shrinkage of the polymer fibers 118 which may result in loss in the increase in mechanical properties achieved during annealing.

FIG. 18 shows an example of a cross-ply configuration 122 of an annealed, bi-directionally stretched polymer fiber composite article 108 with the tool 202 removed. The composite article 108 may be produced using the process illustrated in FIGS. 7-12 and 15-16. Following resin infusion and resin cure or solidification, the method may include removing the polymer fibers 118 from the tool 202 after curing the resin 114 and after cooling. Although a single composite article 108 is shown in FIG. 18, the process may produce a pair of composite articles 108. For example, one composite article 108 may be trimmed from the upper tool surface 204, and a second composite article 108 may be trimmed from the lower tool surface 204. The resin-infused stretched polymer fiber composite article 108 may be used as a final composite structure 100 to be placed into service. Alternatively, the composite article 108 may be assembled with other components to form a final composite structure 100.

In an example not shown, the method may also include removing the polymer fibers 118 from the tool 202 after annealing the polymer fibers 118 and prior to infusing the polymer fibers 118 with resin 114. For example, the tool 202 may be broken into smaller pieces and separated away from the stretched polymer fibers 118. The stretched polymer fibers 118 may be debulked, consolidated, and/or infused with resin 114 using a bagging assembly 230 similar to the bagging assembly 230 shown in FIG. 15 and described above. As indicated above, the cure temperature is preferably maintained below the annealing temperature to avoid snap-back of the polymer fibers 118 during resin cure.

FIG. 19 is a perspective view of an example of an annealed, bi-directionally stretched polymer fiber composite article 108 retained with the tool 202. In this regard, the method may include retaining the tool 202 with the polymer fibers 118 after curing or solidifying the resin 114 in contrast to removing the tool 202 from the polymer fibers 118 as shown in FIG. 18. In FIG. 19, the tool 202 and the polymer fibers 118 form a polymer element-tool assembly 268 (e.g., a flyaway tool) that may be used in a final composite structure 100. The resin 114 may bond the polymer fibers 118 to the tool 202. In one example, the tool 202 may be comprised of a panel 214 of glass or polycarbonate that may become an integral component of an optically transparent ballistic panel 102 (FIGS. 1-2). In some examples, the tool 202 may be formed of a material selected such that the temperature and strain cycle of the annealing process imparts a compressive stress on the tool material. The compressive stress on the tool material may result in an increase in the mechanical properties of the polymer element-tool assembly 268. For example, the increased compressive stress on the tool 202 may result in an increase in the ballistic properties of a ballistic panel 102 or armor panel containing the polymer element-tool assembly 268.

As indicated above, the annealing step and the curing step may be performed concurrently. In this regard, the polymer element 116 or fibers 118 may be infused with resin 114 and during the cure or solidification process, a thermal cycle may be chosen that anneals the polymer fibers 118 and cures the resin 114 at the same time. Advantageously, the concurrent annealing and curing of the resin 114 reduces the total amount of time required to form a composite article 108 and thereby increases production efficiency.

Although not shown, the tool 202 may be also provided as a panel assembly. The panel assembly may include a pair of tool panels 214 that may be designed to remain attached to the stretched polymer elements 116 after resin cure or solidification. The two (2) separate composite articles 108 may each be used in a final composite structure 100. For example, each one of the composite articles 108 may be included in a ballistic panel 102 (FIG. 1). During the process of fabricating the composite articles 108, the pair of tool panels 214 may be initially placed in back-to-back arrangement with one another such that the internal faces of the tool panels 214 are in faying contact with one another. The panels 214 may be formed of glass, polymeric material, or any other material suitable for the final composite structure 100.

Pre-stretched polymer elements 116 such as polymer fibers 118 may be wrapped around the panel assembly such that the polymer fibers 118 are laid over the exposed faces on opposite sides of the panel assembly. The method may include annealing the polymer fibers 118 by applying heat while constraining a length of the polymer fibers 118 using the panel assembly in a manner described above with regard to FIGS. 7-17. The method may further include infusing the polymer fibers 118 with resin 114, and curing the resin 114 in a manner such that the polymer fibers 118 are adhesively bonded to the exposed faces of the back-to-back tool panels 214. After curing or solidifying the resin 114, the method may include separating the back-to-back tool panels 214 by cutting the polymer fibers 118 along the side edges 206 of the panel assembly at the location of the interface between the tool panels 214. The process may produce a pair of consolidated composite articles 108. Each composite article 108 may comprise a single tool panel 214 having stretched polymer fibers 118 bonded to one side of the panel 214.

FIG. 20 is a perspective view of an example of a consolidated composite article 108 formed of bi-directionally stretched woven fabric 124. The composite article 108 shown in FIG. 18 may be fabricated in a manner similar to the annealed, stretched polymer fiber composite article 108 fabricated in the process illustrated in FIGS. 7-17. For example, each one of the perimeter edges of a piece of woven fabric 124 may be attached to a side edge 206 of a correspondingly shaped tool 202 or panel 214 such that the woven fabric 124 covers a tool surface 204 of the panel 214. In some examples, the upper and lower tool surfaces 204 may each be covered with a separate piece of woven fabric 124. Heat may be applied to anneal the woven fabric 124 while constraining the woven fabric by attachment to the side edges of the tool 202. In some examples, the tool 202 may be selected to have a specific CTE to impart additional stretch into the woven fabric as the tool 202 is heated to improve the mechanical properties of the annealed woven fabric. In some examples, the woven fabric may be infused with resin 114 after annealing after which the resin may be cured or solidified. Following the annealing process, the woven fabric may be infused with resin and/or cured a solidified on or off the tool 202. In other examples, the woven fabric may be infused with resin 114 and cured or solidified concurrently with the annealing process while the woven fabric remains attached to the tool 202.

FIG. 21 is a perspective view of an example of a consolidated composite article 108 formed of relatively thin polymer film 126. The polymer film 126 may be pre-stretched in a separate process. For example, the polymer film 126 may be stretched in a stretched direction, and maybe non-stretched in other directions. To anneal the pre-stretched polymer film 126, the film 126 may be fastened to a tool 202 or panel 214 and heat may be applied to the polymer film 126 while the tool 202 constrains the polymer film 126. The polymer film 126 may be constrained by attaching the polymer film 126 to the side edges of the tool 202. In some examples, the tool 202 may have a specific CTE to impart additional stretch into the polymer film 126 due to thermal expansion the tool 202 during heating, after which the polymer film 126 may be annealed while mounted to the tool 202.

In one example, the tool 202 may have a CTE that is higher in one direction than in other directions of the tool 202. The polymer film 126 may be oriented on the tool 202 such that the desired direction of stretching of the film 126 is generally aligned with the direction of higher CTE of the tool 202. The method may include heating the tool 202, and imparting additional unidirectional stretching 264 of the polymer film 126 in response to heating the tool 202, after which the polymer film 126 and tool 202 may be held at an annealing temperature for a predetermined time period during a thermal cycle of an annealing process. Resin 114 may be applied to the polymer film 126 prior to, during, or following the annealing of the polymer film 126. The resin 114 may be cured or solidified following the annealing process or concurrently with the annealing process.

In FIG. 21, the film 126 may be provided with one or more weakened portions 130, each of which may separate a pair of non-weakened portions 128 of the film 126. The weakened portions 130 may be oriented generally parallel to a stretched direction 262 of the film 126. The weakened portions 130 may improve the ballistic performance of a composite panel in a manner as disclosed in application Ser. No. 13/523,141 filed on Jun. 14, 2012, and entitled SELECTIVELY WEAKENED STRETCHED FILMS to Wilenski et al., the entire contents of which is incorporated herein by reference. The weakened portions 130 may be formed by geometric modification 132 of the film 126 and/or by chemical modification of the film 126.

For example, FIG. 22 is a cross-sectional view of the film 126 illustrating the geometric modification 132 of the film 126. The geometric modification 132 may comprise a localized reduction in the film thickness such as a groove, a notch, and/or a slot formed in the film 126. The localized reduction in film thickness may force the film 126 to fail along the weakened portions 130 during the application of external force to the film 126 such as during a ballistic event. For example, when a ballistic panel containing the stretched film 126 is impacted by a projectile, one or more of the weakened portions of the film 126 may fail and the non-weakened portions may remain intact and continue to absorb kinetic energy of the projectile by deflecting and elongating and thereby decelerating the projectile as it passes through the ballistic panel.

FIG. 23 is a top view of an example of a tool 202 configured as a pair of parallel beams 220. The beams 220 may be interconnected by a pair of connectors 222 which may be fastened to the opposing ends of the beams 220. FIG. 24 shows polymer fibers 118 in a unidirectional configuration 120 wrapped around the pair of beams 220 of FIG. 23 prior to annealing the polymer fibers 118. The polymer fibers 118 may be attached to the side edges 206 of the beams 220 in a manner similar to the attachment of the polymer fibers 118 shown in FIGS. 7-17. Resin 114 may be applied to the polymer fibers 118 before, during, or after annealing of the polymer fibers 118. The annealing step and the curing or solidifying step may be performed sequentially or concurrently in the manner described above. Although not shown, the tool 202 of FIG. 23 may include one or more actuators (not shown) configured to expand the distance between the parallel beams 220 to impart additional stretching into the polymer fibers 118, after which the polymer fibers 118 may be annealed while the beams constrain the polymer fibers 118.

FIG. 25 is a sectional view of the fiber-wrapped tool 202 of FIG. 24. In some examples, the infusion of the polymer fibers 118 with resin 114 may result in the resin 114 filling the space between the upper and lower wraps of polymer fibers 118. The cured or solidified resin 114 may be removed by trimming the polymer fibers 118 along the trim lines 260 after resin curing or solidification. Alternatively, the resin 114 may be retained within the tool 202 for use in a final composite structure 100. FIG. 26 is a side view of a pair of consolidated composite articles 108 including annealed polymer fiber 118 embedded in resin 114 and formed using the parallel beams 220. Each one of the composite articles 108 in FIG. 25 may be trimmed from the tool 202 of FIG. 25 along the trim lines 260.

FIG. 27 is a top view of a further example of a tool 202 configured as a frame 216 having a hollow frame interior 218. The method may include attaching one or more polymer elements 116 such as polymer fibers 118 to one or more side edges 206 of the frame 216. For example, polymer fibers 118 may be wrapped around the frame 216 similar to the example shown in FIGS. 7-10. The frame 216 may be formed of a material having a relatively low CTE, or the frame 216 may have a specific CTE selected to impart additional stretching into the polymer fibers 118 upon heating of the frame 216.

FIG. 28 is a top view of stretched polymer fibers 118 wrapped around the frame 216 of FIG. 27 in a cross-ply arrangement prior to annealing and resin infusion of the polymer fibers 118. As indicated above, the annealing step and the curing or solidifying step may be performed sequentially or concurrently. FIG. 29 is a sectional view taken along line 29 of FIG. 28 and illustrating resin 114 infused into the polymer fibers 118 and filling the hollow frame interior 218. The resin 114 may be infused into the polymer elements 116 and the annealing may be performed during resin cure or solidification. In this manner, a layered composite article 108 with a resin core may be fabricated.

Figure 31:
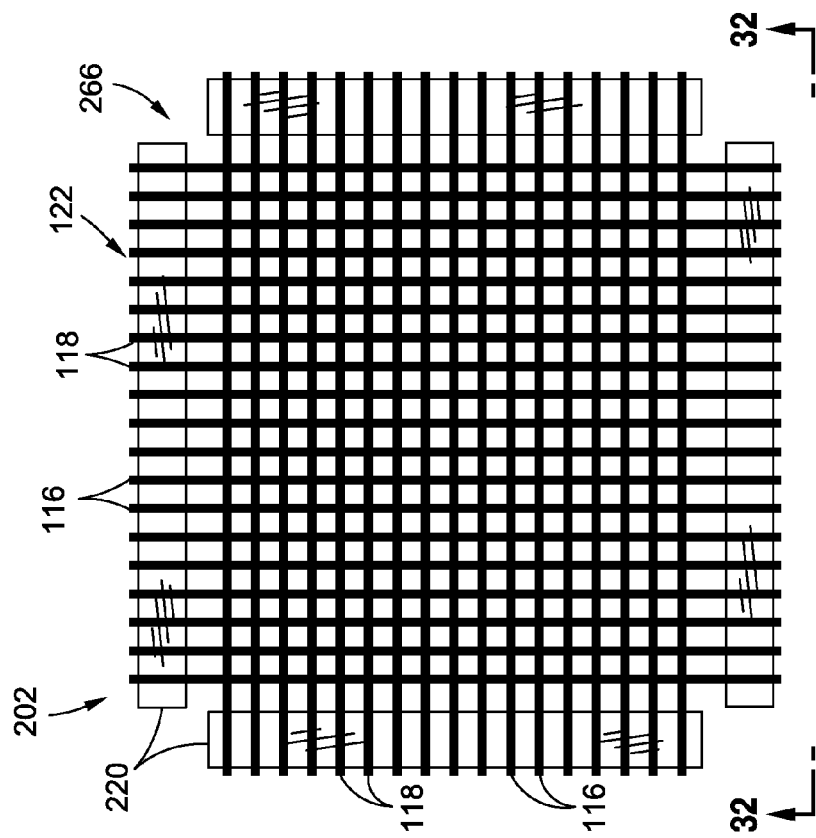
FIG. 31 is a top view of polymer fibers wrapped around each one of the pairs of parallel beams of FIG. 30 prior to annealing and resin infusion of the polymer fibers.
Figure 30:
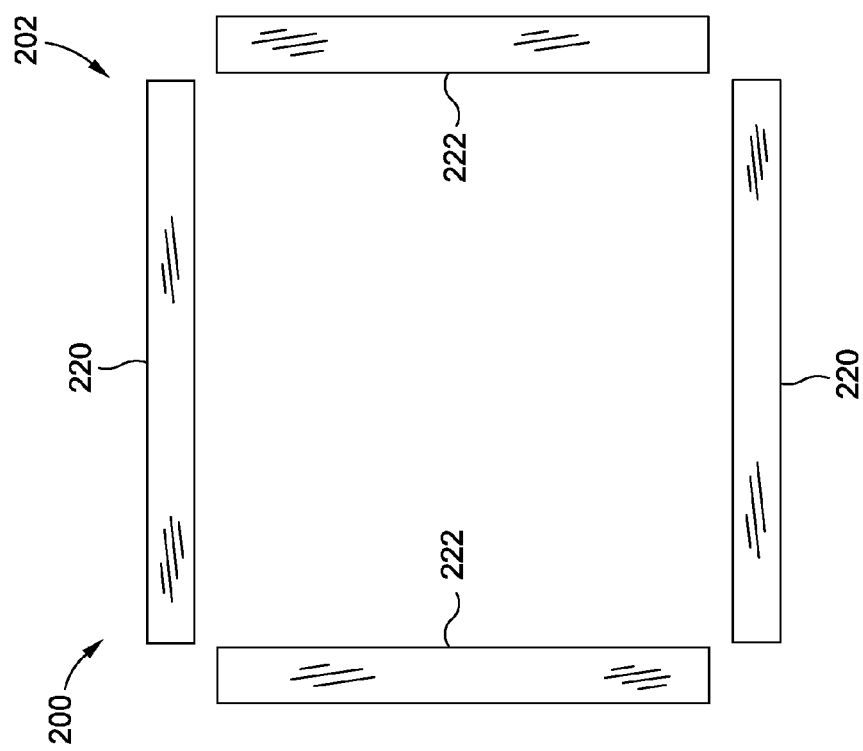
FIG. 30 is a top view of another example of a tool arranged as two pairs of parallel beams.

FIG. 30 is a top view of another example of a tool 202 arranged as two pairs of parallel beams 220. Although not shown, each pair of beams 220 may be interconnected by a pair of connectors 222 (FIG. 21) which may be fastened to opposing ends of the beams 220. Polymer fibers 118 may be wrapped in a unidirectional configuration around each pair of beams 220 in a manner described above with regard to FIGS. 23-24. FIG. 31 is a top view of polymer fibers 118 wrapped around the pairs of parallel beams 220 of FIG. 30 prior to annealing and resin infusion of the polymer fibers 118. Although not shown, one or more actuators may be coupled to one or both of the pair of parallel beams 220 to impart additional stretch into the polymer fibers 118 wrapped around the pairs of beams, after which the fibers 118 may be annealed.

FIG. 32 is an end view of the tool 202 in an example illustrating a nested formation of the fiber-wrapped pair of beams 220 of FIG. 31. Although not shown, connectors connecting one of the pairs of beams 220 may include openings to allow the other fiber-wrapped pair of beams 220 to pass through. In this regard, one of the fiber-wrapped pair of beams 220 may be sized and configured to fit within the interior space defined by the other fiber-wrapped pair of beams 220. The polymer fibers 118 may be annealed and a predetermined temperature while attached to the tool 202. Resin may be applied to the polymer fibers 118 before, during, or after the annealing process. FIG. 33 is a side view of one or more consolidated composite articles 108 formed using the nested parallel beams 220 of FIG. 32. In one example, consolidation pressure may force the polymer fibers 118 to form a single, cured composite article.

FIG. 34 is an example of the pair of fiber-wrapped beams 220 arranged in a stacked formation. FIG. 35 is a side view of one or more consolidated composite articles 108 that may be formed using the stacked parallel beams 220 of FIG. 32. In one example, consolidation pressure may force the polymer fibers 118 together to form a single composite article 108 after resin cure or solidification.

Figure 36:
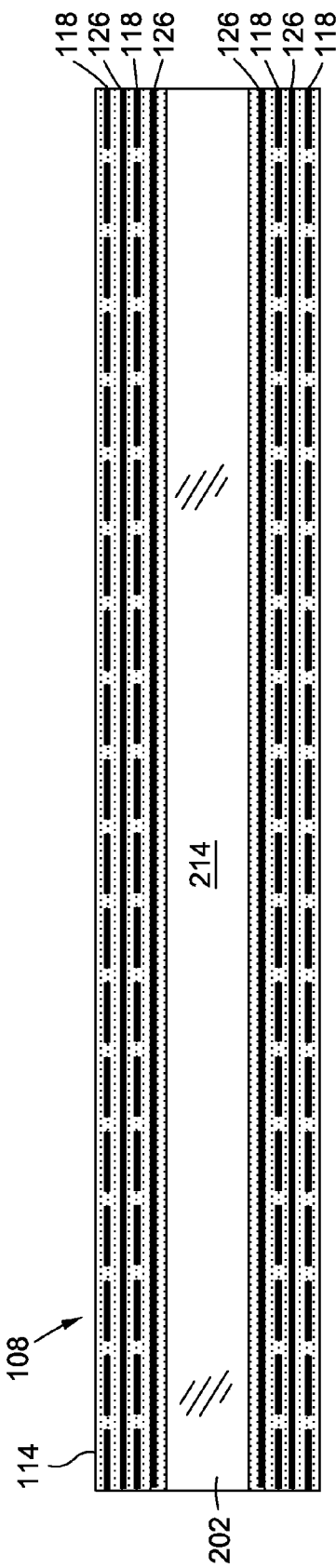
FIG. 36 is a side view of an example of a consolidated composite article containing a tool having wraps of pre-stretched polymer fibers alternating with layers of polymer film on each of the upper and lower surfaces of the tool.

FIG. 36 is a side view of an example of a consolidated composite article 108 containing a tool 202 configured as a panel 214. In some examples, the tool 202 may be configured as a panel assembly formed of a pair of back-to-back panels 214 as described above. The composite article 108 may be manufactured using the above-described process illustrated in FIGS. 7-17 for wrapping pre-stretched polymer fibers 118 around the tool 202, and further including applying alternating layers of polymer films 126 or polymer plates between the pre-stretched polymer fibers 118 wrapped around the tool 202. One or more of the films 126 or plates may be pre-stretched prior to laying up in alternating layers with the wrapped polymer fibers 118. The polymeric film 126 or plate may be formed of polymeric material such as polycarbonate, polyurethane, or other thermoplastic material. One or more of the films 126 or plate may also be provided as a bi-axially-oriented ply or as a unidirectional ply.

After curing or solidifying the resin, the tool 202 may be retained with the polymer fibers 118 and polymer films 126 resulting in a fiber/film laminate bonded to each of the opposing sides of the tool 202 and which may be implemented in a final composite article. The panels 214 may be formed of glass, polymeric material, or any other material suitable for the final composite structure 100 such as a ballistic panel. For examples where the tool 202 is formed of back-to-back panels 214, the polymer fibers 118 may be cut along the side edges 206 of the panel assembly at the location of the interface between the back-to-back panels 214 after curing or solidifying the resin 114 to form two (2) separate composite articles 108 each containing a panel 214 with the consolidated fiber/film laminate bonded to one side of the panel 214.

Figure 37:
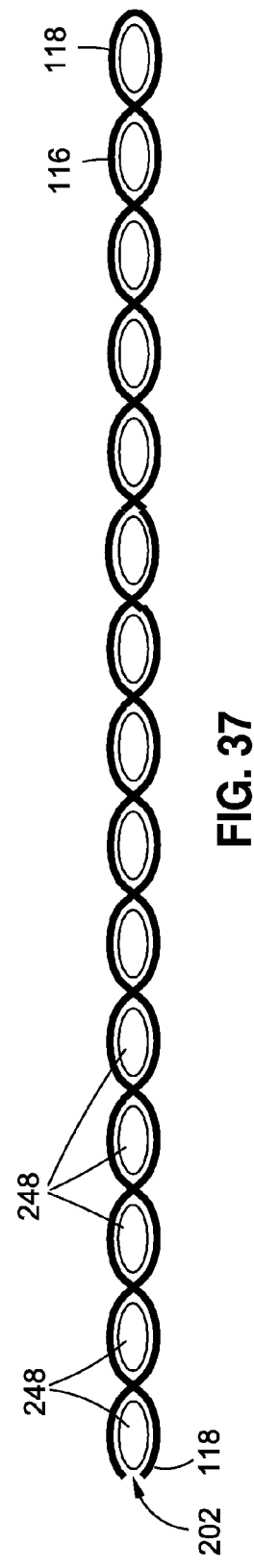
FIG. 37 is a side view of another example of a composite article including a tool arranged as a series of parallel rods 248 or wires having one or more polymer fibers woven through the rods 248 or wires prior to annealing and resin infusion of the polymer fibers.

FIG. 37 is a side view of another example of a composite article 108 that may be formed using a tool 202 arranged as a series of parallel rods 248 or tension wires which are oriented normal to the plane of the paper. One or more pre-stretched polymer fibers 118 may be woven through the rods 248 or wires in a manner such that the length of the polymer fibers 118 is constrained. The rods 248 may be described as the weft, and the polymer fibers 118 may be described as the warp of the woven pattern formed by the fibers 118 and rods 248. After weaving and attaching the end of the polymer fibers 118 to the rods 248, heat may be applied to anneal the polymer fibers 118.

Although each one of the rods 248 is shown as having a generally rounded or oval cross-sectional shape, the rods 248 may be provided in any rounded and/or non-rounded cross-sectional shape. For example, the rods 248 may be provided as parallel ribbons or plates. Resin 114 may be applied to the polymer fibers 118 prior to or after attachment to the tool 202 or following the annealing process. In an even further example not shown, the rods 248 or wires may be configured in a manner to allow weaving of polymer fibers 118 in a cross-ply configuration to form a checkerboard pattern when the tool 202 is viewed from above or below. Following annealing and resin curing or solidification, the rods 248 or wires may be retained with the tool 202 for use in a final composite structure. Alternatively, the polymer elements 116 may be removed from the tool 202 following the annealing process. In some examples, the polymer elements 116 may be flattened or consolidated following removal from the tool 202 and prior to curing or solidifying the resin.

FIG. 38 is a top view of an example of a tool 202 configured as a hexagonally-shaped panel 214. As indicated above, in the present disclosure, the panel 214 may be provided in any shape to allow for any one of a variety of different fiber orientations. FIG. 39 is a top view of polymer fibers 118 wound around the hexagonally-shaped shape tool 202 and showing the fibers 118 oriented along three different fiber angles. As may be appreciated, the tool 202 may be configured in any one of a variety of different shapes to result in the desired fiber angles of the stretched polymer fibers 118. Any combination of tool shape and fiber spacing may be used. In addition, fiber angles may be changed by changing the fiber spacing and/or fiber wrapping angle.

Figure 40:
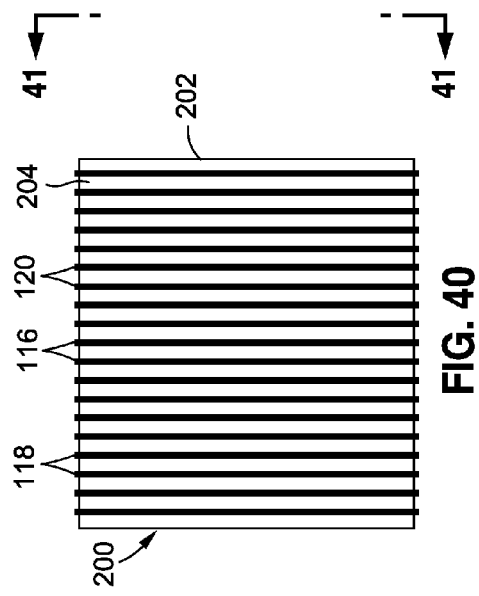
FIG. 40 is a side view of an example of a single ply of polymer fibers wrapped around a cylindrically-shaped tool.

FIG. 40 is a side view of an example of a single ply of one or more pre-stretched polymer fibers 118 wrapped around a cylindrically-shaped tool 202. One end of the polymer fiber 118 may be attached to the outer tool surface 204. The polymer fiber 118 may be wrapped around the tool 202 and the opposing ends of the polymer fiber 118 may be attached to the outer surface of the tool 202 in a manner constraining the length of the polymer fiber. Heat may be applied to the polymer fiber during an annealing process. The resin 114 may be cured and/or solidified to form a cylindrically-shaped consolidated composite article 108.

Figure 41:
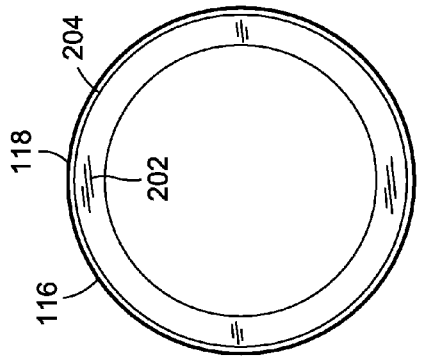
FIG. 41 is an end view of stretched polymer fibers wrapped around the cylindrically-shaped tool of FIG. 40.
Figure 42:
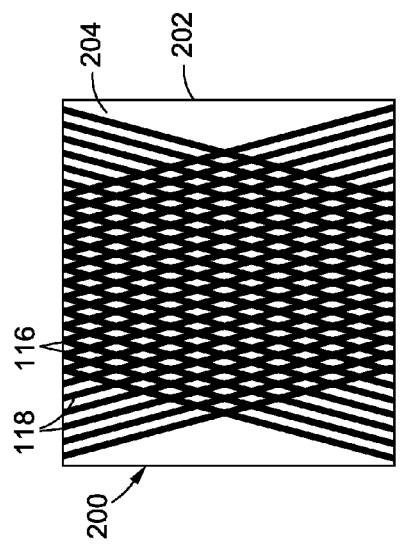
FIG. 42 is a side view of an example of two plies of polymer fibers wrapped around a cylindrically shaped tool along two fiber angles.

FIG. 41 is an end view of a pre-stretched polymer fiber 118 wound around the cylindrically-shaped tool 202 of FIG. 40. In some examples, the cylindrically-shaped tool 202 may be formed of a tool material having a CTE that results in additional stretch being imparted to the polymer fibers 118 after which the polymer fibers 118 may be annealed. The resin 114 may be cured and/or solidified to form a cylindrically-shaped consolidated composite article. FIG. 42 is a side view of an example of two (2) plies of polymer fibers 118 wrapped around a cylindrically shaped tool 202 along two fiber angles. As may be appreciated, any number of polymer fibers 118 may be wrapped around the tool 202 at any number of different fiber angles. The polymer fibers 118 may be annealed and cured or solidified sequentially or concurrently as described above.

FIG. 43 is a graph illustrating an example of a thermal cycle 400 that may be implemented for annealing and curing or solidifying a composite article 108. The graph plots temperature 404 vs. time 402 and illustrates an increase in oven temperature from room temperature $T_{room}$ up to an annealing and/or curing temperature $T_{a,c}$ during a hold period 406 for curing the resin 114 concurrently with annealing the polymer elements 116 that may be embedded within the resin 114. Following the concurrent annealing and curing, the polymer elements/resin/tool may be allowed to cool to room temperature $T_{room}$.

FIG. 44 is an example of a thermal cycle 400 that may be implemented for annealing the polymer elements 116 and solidifying thermoplastic resin 114 of a composite article 108. The thermal cycle 400 includes a ramp up from room temperature $T_{room}$ to the annealing temperature $T_a$ which may be held for a first hold period 406. The temperature may then be reduced to a resin infusion temperature $T_i$ during which thermoplastic resin 114 may be applied to (e.g., infused into) the polymer elements 116 during a second hold period 408. Following resin infusion, the polymer elements/resin/tool may be allowed to cool to room temperature $T_{room}$.

FIG. 45 is an example of a thermal cycle 400 that may be implemented for annealing the polymer elements 116 and curing thermosetting resin 114 of a composite article 108. Temperature may be ramped up to the annealing temperature $T_a$ which may be held for a first hold period 406 during the annealing of the polymer elements 116. The temperature may then be reduced to room temperature $T_{room}$ after which the annealed polymer elements 116 may be removed from the tool 202. The temperature of the annealed polymer elements 116 may then be infused with resin and the temperature increased to a curing temperature $T_c$ for curing the thermosetting resin 114, after which the polymer elements/resin may be allowed to cool to room temperature $T_{room}$. The curing temperature $T_c$ could be any cure temperature including sub-ambient temperature and room temperature $T_{room}$.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A method of manufacturing a composite article, comprising:
   attaching a polymer element to a tool, the polymer element being pre-stretched prior to attachment to the tool;
   annealing the polymer element at a predetermined temperature while constraining a length of the polymer element using the tool, the polymer element being attached to the tool and being stationary relative to the tool during annealing;
   curing or solidifying resin associated with the polymer element, wherein the annealing step and the curing or solidifying step are performed in at least one of the following manners:
      performing the annealing step prior to the curing or solidifying step;
      performing the annealing step concurrently with the curing or solidifying step.

2. The method of claim 1, wherein the step of annealing the polymer element includes:
   constraining the length of the polymer element during annealing by performing at least one of the following:
      maintaining the polymer element at a specific stretched length using the tool; and
      maintaining the polymer element at a specific strain using the tool.

3. The method of claim 1, further including:
   applying the resin to the polymer element prior to attaching the polymer element to the tool.

4. The method of claim 1, further including:
   applying the resin to the polymer element while the polymer element is attached to the tool.

5. The method of claim 1, further including:
   removing the polymer element from the tool after annealing the polymer element and prior to curing or solidifying the resin.

6. The method of claim 1, wherein:
   the step of annealing the polymer element and the step of curing or solidifying the resin are performed with the polymer element mounted on the same tool in both steps.

7. The method of claim 1, further including:
   removing the polymer element from the tool after curing or solidifying the resin.

8. The method of claim 1, further including:
   retaining the tool with the polymer element after curing or solidifying the resin; and
   the polymer element and the tool comprising a polymer element-tool assembly being configured for use in a final composite structure.

9. The method of claim 1, wherein the tool is formed of a tool material having a tool coefficient of thermal expansion (CTE), the method further including:
   heating the tool during annealing; and
   imparting additional stretch to the polymer element in response to expansion of the tool when heated.

10. The method of claim 1, wherein the step of attaching the polymer element to the tool includes:
    wrapping one or more polymer fibers around the tool.

11. The method of claim 1, wherein the step of attaching the polymer element to the tool includes:
    attaching the polymer element to one or more faces and/or one or more side edges of a solid panel.

12. The method of claim 1, wherein the step of attaching the polymer element to the tool includes:
    attaching the polymer element to side edges of a frame having a hollow frame interior; and
    infusing the polymer element with resin; and
    filling the hollow frame interior with resin when infusing the polymer element with resin.

13. The method of claim 1, wherein the step of attaching the polymer element to the tool comprises:
    extending the polymer element between a spaced pair of beams.

14. The method of claim 1, wherein:
    the tool has a tool surface against which the polymer element lays such that when the resin is cured or solidified, the polymer element retains a shape or contour of the tool surface.

15. The method of claim 1, wherein:
    the tool is formed of at least one of the following materials: metal, glass, ceramic, glass-ceramic, polymeric material, glass-fiber-reinforced polymeric material, carbon-fiber-reinforced polymeric material, foams, honeycomb.

16. The method of claim 1, wherein:
    the polymer element after annealing is thermally stable at a cure temperature, at a resin infusion temperature, and at an application temperature of an operating environment in which the polymer element will be used.

17. The method of claim 1, wherein:
    the polymer element is at least one of the following: a fiber tow, unidirectional tape, woven fabric, braided fibers, film.

18. The method of claim 1, wherein the polymer element and/or the resin is comprised of at least one of the following:
    thermoplastic material including at least one of the following: acrylics, fluorocarbons, polyamides, polyolefins, polyesters, polycarbonates, polyurethanes, polyaryletherketones, polyetherimides, polyethersulfone, polysulfone, polyphenylsulfone, polyoxymethylene, and polyethylene;
    thermosetting material including at least one of the following: polyurethanes, phenolics, polyimides, sulphonated polymer, a conductive polymer, benzoxazines, bismaleimides, cyanate esthers, polyesters, epoxies, and silsesquioxanes.

19. A method of manufacturing a polymer-element-reinforced composite article, comprising:
- attaching a polymer element to a tool, the polymer element being pre- stretched prior to attachment to the tool;
- infusing the polymer element with resin while the polymer element is attached to the tool, the polymer element being attached to the tool and being stationary relative to the tool during annealing;
- annealing the polymer element while constraining a length of the polymer element using the tool; and
- curing or solidifying the resin, wherein the annealing step and the curing or solidifying step are performed concurrently.

20. A method of manufacturing a polymer-element-reinforced composite article, comprising:
- attaching a polymer element to a tool, the polymer element being pre- stretched prior to attachment to the tool;
- infusing the polymer element with resin while the polymer element is attached to the tool, the polymer element being attached to the tool and being stationary relative to the tool during annealing;
- annealing the polymer element while constraining a length of the polymer element using the tool; and
- curing or solidifying the resin, wherein the annealing step is performed prior to performing the curing or solidifying step.

* * * * *